United States Patent [19]
Ristey et al.

[11] Patent Number: 5,851,610
[45] Date of Patent: Dec. 22, 1998

[54] SHRINK FILMS AND ARTICLES INCLUDING THE SAME

[75] Inventors: William J. Ristey, Berwyn; George A. Senich, Norristown; William J. Hill, Landenberg, all of Pa.; Harry S. Anderson, Newark, Del.

[73] Assignee: Applied Extrusion Technologies, Inc., Peabody, Mass.

[21] Appl. No.: 359,160

[22] Filed: Dec. 19, 1994

Related U.S. Application Data

[63] Continuation of Ser. No. 144,629, Nov. 2, 1993, abandoned, and Ser. No. 35,511, Mar. 22, 1993, abandoned, which is a continuation of Ser. No. 691,415, Apr. 25, 1991, abandoned, which is a continuation-in-part of Ser. No. 651,966, Feb. 7, 1991, abandoned, which is a continuation-in-part of Ser. No. 651,966, Feb. 7, 1991, abandoned, said Ser. No. 144,629, is a continuation of Ser. No. 37,468, Mar. 26, 1993, abandoned, which is a continuation of Ser. No. 651,966, Feb. 7, 1991, abandoned.

[51] Int. Cl.⁶ .......................... B32B 27/06; B32B 27/32; B32B 31/14
[52] U.S. Cl. ........................ 428/34.9; 428/332; 428/339; 428/461; 428/523; 428/910; 264/290.2; 264/288.4
[58] Field of Search ................................... 428/910, 34.9, 428/35.1, 35.2, 515, 516, 523, 332; 264/289.6, 290.2, 288.4, DIG. 71, 342 R, 230

[56] References Cited

U.S. PATENT DOCUMENTS

| | | | |
|---|---|---|---|
| T981,003 | 4/1979 | Bartron et al. | 264/210 R |
| 3,235,433 | 2/1966 | Cvacho et al. | 156/299 |
| 3,510,549 | 5/1970 | Tsuboshima et al. | 264/567 |
| 3,634,553 | 1/1972 | Faglia et al. | 260/897 |
| 3,753,828 | 8/1973 | Manne et al. | 156/333 |
| 3,808,304 | 4/1974 | Schirmer | 264/289 |

(List continued on next page.)

FOREIGN PATENT DOCUMENTS

| | | |
|---|---|---|
| 1203515 | 4/1986 | Canada . |
| 1233766 | 3/1988 | Canada . |
| 0204843 | 12/1980 | European Pat. Off. . |
| 0095942 | 12/1983 | European Pat. Off. . |
| 0210646 | 2/1987 | European Pat. Off. . |
| 0267799 | 5/1988 | European Pat. Off. . |

(List continued on next page.)

OTHER PUBLICATIONS

Trade Literature; American Fuji Seal, Inc.; Jan. 15, 1991.
Eastman˙ Polyester Plastics for Packaging; Kodak Mar. 1990.
Developmental Typical Values; Mobil Chemical Company, Sep. 1, 1990.

(List continued on next page.)

*Primary Examiner*—Vivian Chen
*Attorney, Agent, or Firm*—Caesar, Rivise, Bernstein, Cohen & Pokotilow, Ltd.

[57] ABSTRACT

A shrink film comprising a biaxially oriented polymer film comprising polypropylene having a machine direction shrinkage and a transverse direction shrinkage that is less than or equal to 50% of the machine direction shrinkage, and wherein the machine direction shrinkage is greater than 15% and the transverse direction shrinkage is less than 10% at about 140° C. The shrink film is formed by a process comprising subjecting a biaxially oriented polymer film to a treatment which comprises the heating the film to a temperature of about 100° C. to 180° C. The heated film is drawn under conditions to extend it by at least 1.05 times its original length in the machine direction. The drawn film is cooled under tension to produce a shrink film having the specified ratio between the machine direction shrinkage and the transverse direction shrinkage in addition to having a kinetic film-to-film coefficient of friction of about 0.05 to 0.40. The shrink film is suitable for wrapping contoured articles.

14 Claims, 5 Drawing Sheets

U.S. PATENT DOCUMENTS

| | | | |
|---|---|---|---|
| 3,863,374 | 2/1975 | Ray | 40/306 |
| 4,032,493 | 6/1977 | Pascual | 524/489 |
| 4,113,935 | 9/1978 | Schippern et al. | 526/351 |
| 4,156,709 | 5/1979 | Kondo et al. | 264/210.6 |
| 4,163,080 | 7/1979 | Buzio et al. | 428/424.8 |
| 4,190,168 | 2/1980 | Jacques | 215/12.2 |
| 4,277,594 | 7/1981 | Matthews et al. | 526/352 |
| 4,335,069 | 6/1982 | Levy | 264/290.2 |
| 4,355,076 | 10/1982 | Gash | 428/411.1 |
| 4,430,289 | 2/1984 | McKinney et al. | 264/210.6 |
| 4,436,888 | 3/1984 | Copple | 526/348.1 |
| 4,501,634 | 2/1985 | Yoshimura et al. | 156/244.24 |
| 4,533,509 | 8/1985 | Gust et al. | 264/211 |
| 4,608,284 | 8/1986 | Roales | 428/34.9 |
| 4,649,009 | 3/1987 | Shibata et al. | 264/235.8 |
| 4,694,633 | 9/1987 | Fujio et al. | 53/49 |
| 4,704,173 | 11/1987 | Hoffman | 156/86 |
| 4,828,928 | 5/1989 | Shah | 428/518 |
| 4,844,957 | 7/1989 | Hoffman | 428/34.7 |
| 4,857,399 | 8/1989 | Vicik | 428/332 |
| 4,865,902 | 9/1989 | Golike et al. | 428/215 |
| 4,879,177 | 11/1989 | Boice | 428/339 |
| 4,911,976 | 3/1990 | Park et al. | 428/216 |
| 4,921,749 | 5/1990 | Bossaert et al. | 428/216 |
| 4,923,557 | 5/1990 | Dickey | 156/86 |
| 4,927,708 | 5/1990 | Herran et al. | 428/332 |
| 4,971,845 | 11/1990 | Aaker et al. | 428/34.9 |
| 4,975,313 | 12/1990 | Ezawa et al. | 428/213 |
| 4,977,002 | 12/1990 | Hoffman | 428/34.7 |
| 5,001,016 | 3/1991 | Kondo et al. | 428/516 |
| 5,057,177 | 10/1991 | Balloni et al. | 156/244.11 |
| 5,091,237 | 2/1992 | Schloegl et al. | 264/291 |
| 5,128,212 | 7/1992 | Kneale et al. | 156/244.11 |
| 5,132,157 | 7/1992 | Asanuma et al. | 264/211 |
| 5,234,733 | 8/1993 | Schloegl et al. | 428/36.91 |
| 5,292,561 | 3/1994 | Peiffer | 428/35.1 |

FOREIGN PATENT DOCUMENTS

| | | | |
|---|---|---|---|
| 0299750 | 1/1989 | European Pat. Off. . | |
| 0321964 | 6/1989 | European Pat. Off. . | |
| 0340579 | 11/1989 | European Pat. Off. . | |
| 0348749 | 1/1990 | European Pat. Off. . | |
| 0349960 | 1/1990 | European Pat. Off. . | |
| 0477742 | 4/1990 | European Pat. Off. . | |
| 0477742 | 4/1992 | European Pat. Off. . | |
| 2057255 | 5/1972 | Germany . | |
| 4986459 | 12/1972 | Japan . | |
| 55-19539 | 2/1980 | Japan | 264/300 |
| 55-51537 | 4/1980 | Japan | 264/210.6 |
| 645545 | 6/1980 | Japan . | |
| 57-23620 | 5/1982 | Japan . | |
| 57-105351 | 6/1982 | Japan . | |
| 58-119827 | 7/1983 | Japan . | |
| 59-9030 | 1/1984 | Japan . | |
| 59-49958 | 3/1984 | Japan . | |
| 62-56117 | 3/1987 | Japan . | |
| 62-62846 | 3/1987 | Japan . | |
| 63-62390 | 3/1988 | Japan . | |
| 63-304032 | 12/1988 | Japan . | |
| 64-5545 | 1/1989 | Japan . | |
| 1103441 | 4/1989 | Japan . | |
| 1120339 | 5/1989 | Japan . | |
| 1153430 | 6/1989 | Japan . | |

OTHER PUBLICATIONS

"Your Partners in Packaging"; M.S.Gilbreth Packaging Systems.

First Page English Abstracts of Japanese Pat. Nos. 60,135, 233; 60,171,150; 63,086,744; 63,304,032; 62,086,388–A; 61,047,234A.

Polymer Chemistry Abstract, P.3, WO9217306.A1 (Oct. 15, 1992).

First Page English Abstracts of Japanese Patent Nos.: 62–62846, 62–56117, 1103441, 63–304032, 1120339, 1153430, 63–62390, 64–5545, & EPO No. 0340579.

Breuer 7 Martin; Fatty Amide Slip and Antiblock Additives in Polypropylene and Linear Low Density Polyethylene; pp. 141–144, Antec (1984).

Derwent Publn. Ltd., An89–188784 & JP–A–1127317, May 19, 1989 (Abstract).

Extrel* Polypropylene Film; Exxon Chemical Company.

Opticite™ Soft Drink Label Film; Dow Chemical Company (1984).

Starpack; Polifilms s.r.l.

Opticite Soft Drink Label Film; Dow Chemical Co. (1984).

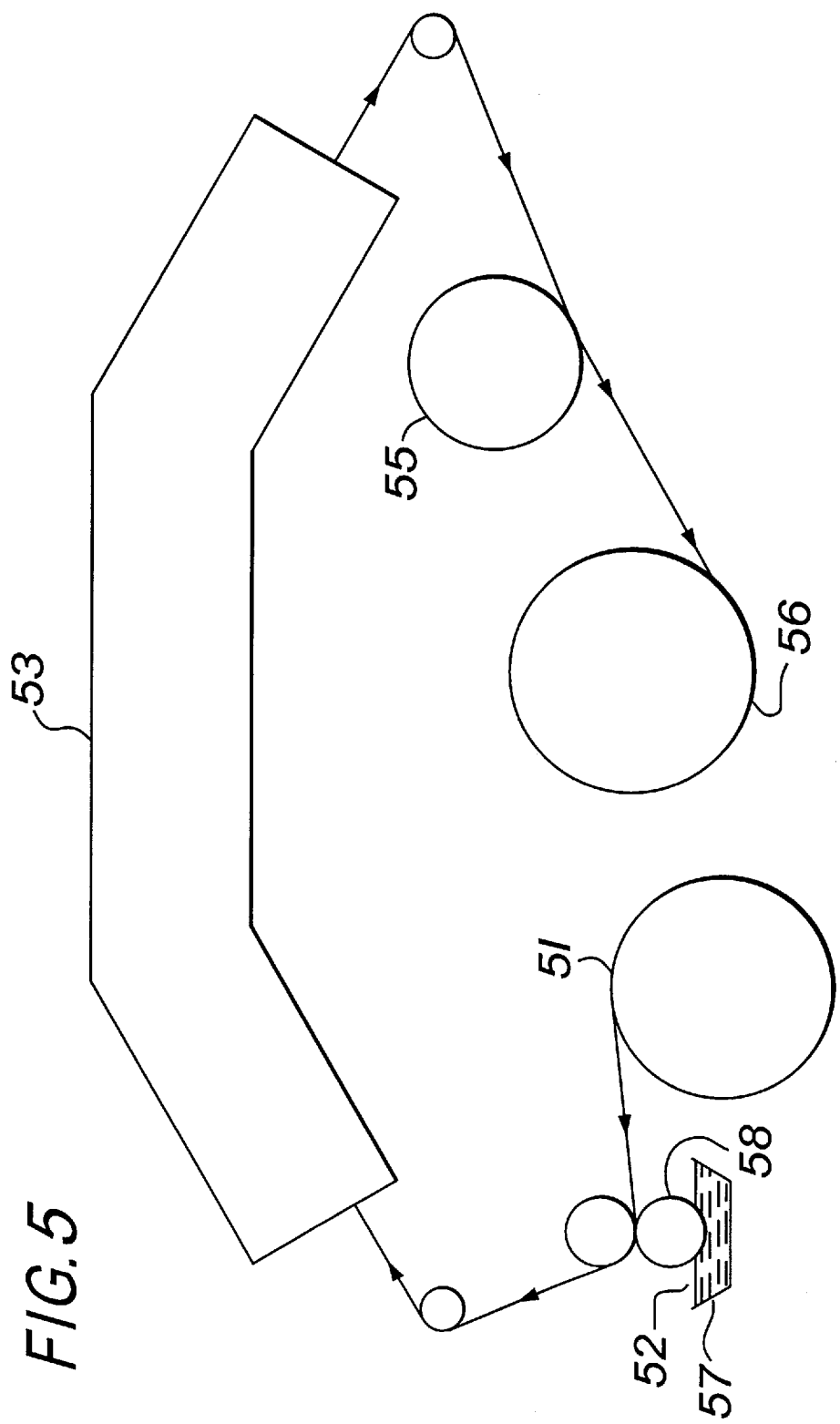

SHRINK FILMS AND ARTICLES INCLUDING THE SAME

RELATED APPLICATIONS

This application is a continuation of commonly owned, application Ser. Nos. 08/035,511, filed Mar. 22, 1993, entitled Low Coefficient of Friction Shrink Films and Laminates, naming as inventors William J. Hill, IV and George A. Senich, now abandoned; and 08/144,629, filed Nov. 2, 1993, entitled Process for Producing Shrink Film and Resultant Shrink Film Layers and Laminates, naming as inventors Harry S. Anderson, II, William J. Ristey and George A. Senich, now abadoned. Application Ser. No. 08/035,511, is a continuation application of application Ser. No. 07/691,415, filed Apr. 25, 1991, now abandoned, which was a Continuation-In-Part of application Ser. No. 07/651, 966, filed Feb. 7, 1991, now abandoned. Application Ser. No. 08/144,629, was a continuation of application Ser. No. 08/037,468, filed Mar. 26, 1993, entitled Process for Producing Shrink Film and Resultant Shrink Film Layers and Laminates, now abandoned, which was a continuation application of application Ser. No. 07/651,966, filed Feb. 7, 1991, now abandoned.

BACKGROUND OF THE INVENTION

1. Field of the Invention

The present invention is directed to processes for producing shrink films having high unidirectional shrinkage and resultant shrink films; processes of using such shrink films to produce laminates and resultant laminates of such shrink films and processes for using such shrink films and laminates to package and/or label articles, and resultant articles to which such shrink film or laminates of such shrink film are applied.

More specifically the present invention is directed to the previously mentioned embodiments with respect to utilizing oriented polymer films, i.e., oriented polypropylene (OPP) films, to produce polyolefin shrink films and laminates having high unidirectional shrinkage which are particularly advantageous in labeling articles, such as beverage containers, having irregular shapes.

Additionally, the present invention is directed to the previously mentioned embodiments with respect to utilizing oriented polymer films, i.e., oriented polypropylene (OPP) films, to produce polyolefin shrink films and laminates having a low coefficient of friction and high unidirectional shrinkage which are advantageous in labeling articles, such as beverage containers, having irregular shapes, particularly those processed through high speed filling and/or packaging machinery.

2. Discussion of Background and Material Information

A distinguishing characteristic of shrink film is its capacity, upon exposure to some level of heat, to shrink or, if restrained, to create shrink tension within the film. When such a shrink film is used in a process to label or wrap a container, and then is subjected to a heat history, this process causes the film to shrink around the product producing a tight, transparent or opaque, wrapping that conforms to the contour of the article and provides useful functions required of label or packaging materials.

An important characteristic of a label or packaging film, particularly for labels or packaging films which are applied to articles which are subjected to high speed processing, such as filling, packing and assembly, is the coefficient of friction of the label or packaging film applied to the surface of the container. Inasmuch as efficiencies and economies of production are realized when film labeled containers can be processed through high speed (100–2500 containers/min.) commercial filling and packing machinery, a low COF on the label surface is required for these high speeds to be reached. This is particularly important in the beverage industry wherein bottles and cans, typically having an irregular shape, are filled and otherwise packaged at extremely high speeds. As a point of reference, typical litho-printed or dry offset printed aluminum beverage cans have surface-to-surface kinetic coefficients of friction (COF) of less than or equal to about 0.22.

Another important characteristic of a label or packaging film, particularly shrink films, is its capacity, upon exposure to some level of heat, to shrink or, if restrained, to create shrink tension within the film. When such a shrink film is used in a process to label or wrap a container, and then is subjected to a heat history, this process causes the film to shrink around the product producing a tight, transparent, translucent or opaque wrapping that conforms to the contour of the article and provides useful functions required of label or packaging materials.

In many practical uses, containers, as well as other articles, are envisioned to be labeled with a shrink film or a multi-layer film lamination wherein at least one layer is a shrink film. In such instances, the graphics and printing are trapped between the films for protection from scuffing and damage but are visible through the outer clear film layer.

The ability of a film to shrink upon exposure to some level of heat arises from the orientation of the film during manufacture. During film manufacture, the films are usually heated to their orientation temperature range, which varies with the different polymers used for the films, but is usually above room temperature and below the melting temperature of the polymer. The film is then stretched in the cross or transverse direction (TD) and in the longitudinal or machine direction (MD) to orient it. After being stretched, the film is rapidly cooled to quench it, thus freezing the film in its oriented state. Upon heating, the orientation stresses are relaxed and the film will begin to shrink back to its original, unoriented dimension.

The polyvinyl chloride (PVC), polystyrene, polyester, and polyolefin families of shrink films provide a wide range of physical and performance film characteristics. Film characteristics play an important role in the selection of a particular film and may differ for each type of packaging or labeling application.

Polyolefins have been most successful with applications where moderate to high shrink forces are preferred. Polyolefin films are also used on automatic, high speed shrink wrapping equipment where shrink and sealing temperature ranges are more clearly controlled. Polyolefin films are particularly suitable for this application because polyolefin films tend to be cleaner, leaving fewer deposits and less residue, which extend the life of the equipment as well as reducing equipment maintenance. The PVC films generally have lower shrink forces, and will seal and shrink over much broader temperature ranges than the polyolefins. A drawback to PVC films, however, is their tendency to emit noxious gases upon heat sealing and upon combusting during incineration, resulting in corroded machinery as well as a health hazard.

In general, films having reduced coefficients of friction are well known as slip films to those skilled in the film art. As used herein a kinetic film-to-film COF of greater than about 0.40 to about 0.55 is considered to have a reduced COF and films with a kinetic film-to-film COF of less than about 0.40 are considered for purposes of the present invention to be low COF films. However, films having a reduced coefficient of friction are usually deliberately manufactured to have minimal shrinkage at elevated temperatures where operations such as printing and drying with multicolors of ink and laminating occur.

Because of their low shrinkage at elevated temperatures, conventional slip films are not suitable for article or container labeling applications which are driven by thermally activated shrinkage. In addition, some of the known thermal methods of reducing COF in conventional slip films could lead to degradation in shrinkage properties if they were attempted to be applied to shrink film.

Although there are general disclosures in the prior art which mention shrink films with certain coefficients of friction, it is not believed that such films or laminations are currently available articles of commerce.

This invention addresses, in at least one embodiment, the need for a low COF film or lamination with shrinkage properties suitable for thermally activated shrink labeling of articles or containers which are particularly suitable for use in high speed filling and packaging lines.

SUMMARY OF THE INVENTION

A shrink film comprising a biaxially oriented polymer film having an imbalance of shrinkage consisting essentially of a machine direction shrinkage of greater than a transverse direction shrinkage such that transverse direction shrinkage is less than or equal to machine direction shrinkage/2 and wherein the MD shrinkage is greater than about 15% and the transverse direction shrinkage is less than about 15%, and more preferably 10% at about 140° C.

The invention includes a process for making a shrink film having a predetermined coefficient of friction comprising subjecting a biaxially oriented polymer film selected from the group consisting of a single polymer film layer and a laminate of at least two polymer film layers to a treatment under conditions and time sufficient to produce a polymer shrink film. The treatment comprises the steps of heating the biaxially oriented polymer film to a temperature within the range of about 100° C. to 180° C. The heated biaxially oriented film is drawn under conditions effective to extend the heated biaxially oriented film by at least 1.05 times the original length of the biaxially oriented film in the machine direction. The drawn film is then cooled while the drawn film is under tension whereby a shrink film is produced having an imbalance of shrinkage consisting essentially of a machine direction (MD) shrinkage of greater than a transverse direction (TD) shrinkage such that transverse direction shrinkage is less than or equals machine direction shrinkage/2, and has a kinetic film-to-film coefficient of friction within the range of about 0.05 to 0.40.

The invention includes a process for applying a shrink film having a low coefficient of friction to an article having a contour. The process comprises the steps of providing at least one polymer shrink film having a kinetic film-to-film coefficient of friction within the range of about 0.05 to about 0.40 and having an imbalance of shrinkage consisting essentially of a machine direction (MD) shrinkage greater than transverse direction (TD) shrinkage such that transverse direction shrinkage is less than machine direction shrinkage/2. At least a portion of an article is covered with the shrink film. The article is subjected to heat to shrink the polymer shrink film around at least a portion thereof. The shrink film is shrunk around the portion of the article to conform to its contour.

The present invention is directed to processes for making a biaxially oriented polymer shrink film which involve subjecting a biaxially oriented polymer film to processing conditions and temperature effective to produce biaxially oriented polymer shrink films having thermal shrink properties including shrinkage in the machine direction of the film and transverse direction of the film as a function of the MD reorientation mechanical MD/TD draw ratio, wherein such conditions preferably include an MD reorientation mechanical MD/TD draw ratio between about 1.01 and about 7.5 and a corresponding line speed comprising an input roll speed within the range of about 200 ft/min to about 1,500 ft/min and an output roll speed within the range of about 201 ft/min to about 1,501 ft/min, more preferably wherein the MD reorientation mechanical MD/TD draw ratio is between about 1.10 and 2.00 and the corresponding input roll speed is within the range of about 750 ft/min to about 850 ft/min, and the output roll speed is within the range of about 935 ft/min to about 1500 ft/min, and most preferably wherein the input roll speed is about 800 ft/min and the output roll speed is within the range of about 1100 ft/min to about 1300 ft/min.

The present invention is also directed to processes for making a biaxially oriented polymer shrink film which involve subjecting a biaxially oriented polymer film to processing conditions and temperatures effective to produce biaxially oriented polymer shrink films having thermal shrink properties including shrinkage in the machine direction of the film and transverse direction of the film as a function of temperature, wherein the processing temperature is within the range of about 70° C. to about 160° C., preferably within a range of about 90° C. to about 130° C., and more preferably within the range of about 100° C. to about 120° C.

The present invention is also directed to processes for making a biaxially oriented shrink film which involve heating a biaxially oriented film to a temperature within the temperature range of 100° C. to 151° C.; drawing the heated biaxially oriented film under conditions effective to extend the heated biaxially oriented film at least 1.10 times its original length in the machine direction; and cooling the drawn film while the film is still under tension, whereby a shrink film is produced with thermal shrinkage properties having a function of temperature.

Also, the present invention is directed to a process for producing a laminate film which involves forming a plurality of oriented polymer films into a laminate comprising at least one polymer shrink film having an imbalance of shrinkage consisting essentially of a machine direction (MD) shrinkage greater than a transverse direction (TD) shrinkage, the MD shrinkage and the TD shrinkage are functions of temperature as follows:

| Shrinkage MD (%) | Shrinkage TD (%) | Shrink Test Temperature °C. |
|---|---|---|
| 4 to 15 | −6 to 5 | 100 |
| 6 to 25 | −8 to 7 | 110 |
| 10 to 30 | −10 to 10 | 120 |
| 12 to 40 | −12 to 15 | 130 |
| 20 to 40 | −15 to 15 | 140 |
| 20 to 40 | −20 to 15 | 150 | and wherein the biaxially oriented shrink film exhibits tensile properties in each of the following six ranges of parameters:

| Modulus | |
|---|---|
| MD, psi | 350,000–850,000 |
| TD, psi | 100,000–500,000 |
| Tensile Strength | |
| MD, psi | 30,000–50,000 |
| TD, psi | 15,000–35,000 |
| Ultimate Elongation | |
| MD, % | 20–120 |
| TD, % | 50–250 |

The present invention is also directed to a process for packaging an article within shrink film, which involves providing a biaxially oriented polymer film having an imbalance of shrinkage consisting essentially of a machine direction (MD) shrinkage greater than transverse direction (TD) shrinkage; covering at least a portion of an article with the biaxially oriented polymer film; and subjecting the article having at least a portion covered with the biaxially oriented film to heat at a temperature sufficient to shrink the biaxially oriented polymer film around at least the portion of the article, wherein the article has an irregular shape, preferably wherein the article is a container such as a beverage can.

The present invention is also directed to shrink films, laminates of shrink films, and articles covered at least in part with such shrink films and laminates thereof, wherein the shrink film is composed of a biaxially oriented polymer film having an imbalance of shrinkage consisting essentially of a machine direction (MD) shrinkage greater than a transverse direction (TD) shrinkage in a machine direction shrinkage/transverse direction shrinkage ratio of 2:1. Preferably wherein the MD shrinkage and the TD shrinkage are functions of temperature as follows:

| Shrinkage MD (%) | Shrinkage TD (%) | Shrink Test Temperature °C. |
|---|---|---|
| 4 to 15 | −6 to 5 | 100 |
| 6 to 25 | −8 to 7 | 110 |
| 10 to 30 | −10 to 10 | 120 |
| 12 to 40 | −12 to 15 | 130 |
| 20 to 40 | −15 to 15 | 140 |
| 20 to 40 | −20 to 15 | 150 |

The biaxially oriented film of the present invention preferably exhibits tensile in each of the following six ranges of parameters:

| Modulus | |
|---|---|
| MD, psi | 350,000–850,000 |
| TD, psi | 100,000–500,000 |
| Tensile Strength | |
| MD, psi | 30,000–50,000 |
| TD, psi | 15,000–35,000 |
| Ultimate Elongation | |
| MD, % | 20–120 |
| TD, % | 50–250. |

For purposes of the present invention, and particularly for the shrink films, laminates of shrink films, and shrink films and laminates thereof used to label articles in accordance with the present invention, MD shrinkage is greater than about 15% and the TD shrinkage is about 10% at about 140° C., preferably wherein the TD shrinkage is less than about 5%, and more preferably wherein the TD shrinkage is within the range of about −5% to about 5%. The TD shrinkage may also be less than about 2%; in which case, the TD shrinkage is preferably within the range of about −2% to about 2%. Most preferably, the TD shrinkage is about zero, or wherein the biaxially oriented film has substantially zero TD shrinkage. The MD shrinkage is preferably greater than about 25% at 140° C.

For purposes of the present invention, the biaxially oriented film has a minimum film draw ratio of less than about 1.4 RD. Preferably the minimum film draw ratio is within the range of about 1.01 to 1.4. Film draw ratio is calculated by multiplying the thickness of the film by the width of the film prior to drawing, and dividing that product by the product of the thickness of the film and the width of the film after drawing. The biaxially oriented film of the present invention has a film reorientation MD/TD mechanical draw ratio which is within the range of about 1.01 to about 1.5. Preferably the reorientation MD/TD mechanical draw ratio is within the range of about 1.1 to about 1.37; more preferably, the reorientation MD/TD mechanical draw ratio is within the range of about 1.12 to about 1.35.

For purposes of the present invention, the biaxially oriented film may be selected from the group consisting of clear films and opaque films; the biaxially oriented polymer film may also be selected from the group consisting of monolayer films, multilayer films, coextruded films, extrusion coated films and coated films. The shrink films of the present invention are composed of polyolefins, such as polypropylene. Preferably the biaxially oriented polymer film has a thickness within the range of about 50 to 200 gauge, and more preferably within the range of about 70 to about 140 gauge.

Thus, the present invention is directed to polymer shrink films, such as polyolefin films and laminates with unique thermal shrink characteristics. The thermal shrink properties of the novel polymer shrink films and laminates of the present invention differ from conventional oriented polymer films while still maintaining the useful characteristics of oriented polymer films. Thermal shrink properties of the novel polyolefin films of the present invention are characterized by shrinkage in the machine direction (MD) and transverse direction (TD) as a function of temperature.

The present invention is advantageous in that the useful properties common for oriented polyolefin films are maintained while providing thermally shrinkable polyolefin films and laminates which are particularly useful as labeling and packaging materials.

The novel and unique polymer shrink films and laminates of the present invention are particularly suitable for labelling non-uniformly contoured articles with a printed single layer of the oriented polymer shrink film or printed laminate of oriented polymer shrink film which, by exposure to a prescribed heat history, shrinks to conform to the contour of the article, such as a beverage container.

For purposes of the present invention, certain requirements for the processes for the polymer shrink film manufacture, lamination of the polymer shrink films, and the container labeling and packaging have been discovered to be important in order to realize the advantages of the present invention.

In this regard, it is critical that the shrink film must manifest a resistance to MD directional alteration in dimension during typical label preparation and application to maintain uniform repeat length and registration as imparted by applied heat/or tension history. The film also must be resistant to MD and/or TD directional lamination curl to maintain uniform lamination flatness. The film should maintain overall web flatness, as exhibited by typical oriented polyolefin films, as well as single web or lamination stiffness as required for conventional printing; laminating, and label-to-container feeding operation.

Another important advantage of the present invention is that the use of a polyolefin based label is inherently more environmentally compatible in the manufacture and recycle process. Current shrink labels are foamed polystyrene and PVC. Foamed polystyrene is inherently environmentally unfriendly due to the use of chlorofluorocarbons (CFCs) in the foaming process and PVCs are disliked due to the caustic incineration side products, which are eliminated by the present invention.

The present invention is also directed to a process for making a shrink film having a predetermined coefficient of friction, which involves subjecting a polymer film to a treatment under conditions and time sufficient to produce a polymer shrink film having a reduced or low kinetic film-to-film coefficient of friction of less than about 0.40 to about 0.55 and preferably within the range of about 0.05 to about 0.40. The kinetic film-to-film coefficient of friction of the low COF shrink film produced in accordance with the present invention is more preferably within the range of about 0.1 to about 0.25, and most preferably the kinetic film-to-film coefficient of friction of the low COF shrink film is within the range of about 0.15 to about 0.20.

In accordance with the present invention, the treatment to effect a reduced or low COF in a polymer film may be selected from the group of procedures consisting of migration of a slip agent to the surface of a polymer film, extrusion of a polymer film with a slip agent, coextrusion coating of a polymer film with a slip agent, and extrusion coating a polymer substrate to produce a polymer film comprising a slip agent, direct coating of a polymer film with a material including a slip agent, plasma modification of a polymer film, and providing a hard coating on a polymer film. The procedure may be selected from the group consisting of migration of a slip agent to the surface of film, extrusion of a polymer film with a slip agent, and direct coating of a polymer film with a coating comprising a slip agent. The extrusion-type procedure may be selected from the group consisting of extrusion of a polymer film with a slip agent, coextrusion of a polymer film with a slip agent, and extrusion coating a polymer substrate to form a polymer film including a slip agent. Preferably the extrusion-type procedure is selected from the group consisting of extrusion of a polymer film with a slip agent and coextrusion of a polymer film with a slip agent.

For purposes of these embodiments, the resultant shrink film is a lamination comprising at least one such polymer shrink film having a low coefficient of friction, preferably wherein the surface of the polymer shrink film is a clear outer surface of a lamination of at least one polymer shrink film, and wherein the at least one polymer shrink film comprises at least about 70% by weight polyolefins.

For purposes of the previously mentioned embodiments, the slip agent may be selected from the group consisting of fatty amides, fatty acids, waxes, silicon-containing compounds, fluorine-containing organic compounds, and particulate.

In the embodiment of the present invention which involves migration of the slip agent to a surface of a polymer film, the slip agent may be selected from a group of migratory film additives capable of migrating to the surface of the polymer shrink film over a period of time, e.g., up to about 72 hours. For this embodiment, such migratory film additives may be selected from the group consisting of long chain fatty acid amides, mineral waxes, synthetic waxes, and polysiloxanes, and are preferably selected from the group consisting of long chain fatty acid amides having about 12 to about 22 carbon atoms and dimethyl polysiloxanes.

A related embodiment involves exposing a polymer film including a slip agent selected from a group of heat migratory film additives capable of migrating to the surface of said polymer film upon exposure to heat to an elevated temperature for a time sufficient to cause the slip agent to migrate to the surface of said polymer film, preferably wherein the temperature is within the range of about 35° C. to 65° C. and the time is about 6 hours to about 48 hours. For this embodiment, the migratory film additive capable of migrating to the surface of said polymer shrink film upon exposure to heat may be selected from the group consisting of long chain fatty acid amides having about 12 to about 22 carbon atoms.

Other embodiments of the present invention which may be used to produce a polymer film having such a kinetic film-to-film coefficient of friction include extrusion of a polymer film with a slip agent, and coextrusion, extrusion coating, and coextrusion of a polymer base layer and at least one polymer skin layer to form a polymer film having said kinetic film-to-film coefficient of friction.

For these embodiments of the present invention, the slip agent may be a migratory slip additive selected from the group consisting of fatty acids, fatty amides, migratory hydrocarbon waxes, polysiloxanes, preferably the fatty amides are long chain fatty acid amides having about 12 to about 22 carbon atom and ethylene diamides; the fatty acids are preferably fatty acid glycerides and fatty acid esters; and the polysiloxanes are preferably dimethyl polysiloxanes. Most preferably, the long chain fatty acid amide is preferably selected from the group consisting of erucamide, oleamide, stearamide, and behenamide.

For purposes of coextrusion, the polymer skin layer may also include additives selected from the group consisting of silicon particulate, fluorinated particulate, and polysiloxanes. In this embodiment, at least one polymer skin layer may be selected from the group consisting of polyolefin copolymers and polyolefin terpolymers, wherein the polyolefin copolymers and the polyolefin terpolymers comprise propylene and at least one member selected from the group consisting of ethylene, butene, and hexene, preferably wherein the polymer shrink film comprises an ethylene-propylene copolymer skin layer and the base layer comprises a member selected from the group consisting of polyolefins.

In accordance with the present invention, the shrink film may be a lamination comprising at least one polymer shrink film. Such laminations may include at least one shrink film having a reduced or low coefficient of friction as well laminations which include at least two polymer shrink films having a reduced coefficient of friction, but may also include laminations which include at least one shrink film having a reduced or low coefficient of friction and other films, which may or may not be shrink films.

Preferably, the surface of the polymer shrink film which is treated and has a reduced or low coefficient of friction is a clear outer surface of a lamination of at least one polymer shrink film.

In the embodiment of the present invention wherein the kinetic film-to-film coefficient of friction is effected by applying a direct coating to at least a portion of the surface of the polymer film to result in a coated polymer shrink film, the coating includes polyamide, polyurethane, polyethyleneamine, nitrocellulose lacquer, shellac, nitrocellulose-modified polyamide, nitrocellulose-modified polyurethane, nitrocellulose-modified polyethyleneamine, and nitrocellulose-modified shellac, and the process preferably also involves subjecting the coated film to at least one treatment selected from the group consisting of drying and curing where the coated polymer film is dried, the film is subjected to a web temperature within the range of about 100° F. to about 200° F. for a time within the range of about 0.5 seconds to about 12 hours. Curing is preferably effected by radiation; the preferred radiation techniques are selected from the group consisting of ultra violet radiation, x-ray radiation, gamma-ray radiation, and electron beam radiation. Preferably, the resultant coating should be resistant to heat up to about 150° C.

In another embodiment of the present invention, wherein the kinetic film-tofilm coefficient of friction is effected by applying a hard coating to the polymer shrink film, the hard coating material may be selected from the group consisting of polyamide, polyurethane, polyethyleneamine, nitrocellulose lacquer, shellac, nitrocellulose-modified polyamide, nitrocellulose-modified polyurethane, nitrocellulose-modified polyethylene-amine, and nitrocellulose-modified shellac. In this embodiment, the coated film may be subjected to at least one treatment selected from the group consisting of drying and curing where the coated polymer film is dried, the film is subjected to a web temperature within the range of about 100° F. to about 200° F. for a time within the range of about 0.5 seconds to about 12 hours. Curing is preferably effected by radiation; the preferred radiation techniques are selected from the group consisting of ultra violet radiation, x-ray radiation, gamma-ray radiation, and electron beam radiation. Preferably, the resultant coating should be resistant to heat up to about 150° C. It is then subjected to a web temperature within the range of about 100° F. to about 200° F. for a time within the range of about 0.5 seconds to about 12 hours.

In accordance with the present invention, the hard coating on the polymer film may also be effected by plasma modification of the polymer film, using a plasma material selected from the group consisting of a mixture of inert gas and aliphatic hydrocarbons containing up to 12 carbon atoms, aliphatic hydrocarbons containing up to 12 carbon atoms, a mixture of oxygen and at least one member selected from the group consisting of organosilanes and organosiloxanes.

In accordance with the present invention, the kinetic film-to-film coefficient of friction may be effected by plasma modification of the polymer film with a plasma material, wherein the plasma material includes a member selected from the group consisting of a silicon-containing compounds and fluorine-containing organocompounds, wherein the silicon-containing compound is selected from the group consisting of organosilanes, organosiloxanes and at least two members selected from the group mixtures of organosilanes, organosiloxanes and inert gas, and preferably wherein the silicon-containing compound is selected from the group consisting of tetramethylsilane, tetramethyldisiloxane, trimethoxyvinylsilane, hexamethylcyclotrisiloxane, hexamethyldisiloxane and mixtures of tetramethylsilane, tetramethyldisiloxane, trimethoxyvinylsilane, hexamethylcyclotrisiloxane, and hexamethyldisiloxane, and most preferably wherein the silicon-containing compound is hexamethyldisiloxane.

The fluorine-containing organic compound may be selected from the group consisting of tetrafluoromethane, trifluoromethane, and hexafluoroethane, and mixtures of tetrafluoromethane, trifluoromethane, and hexafluoroethane, and most preferably wherein the fluorine-containing organic compound is hexafluoroethane. In this embodiment, the plasma modification involves exposing the polymer film to the plasma material to result in a polymer film having a kinetic film-to-film coefficient of friction within the range of about 0.05 to about 0.40.

The hard coating may also be effected by vacuum deposition of the coating material which involves the use of an electron beam. In addition to the foregoing, the present invention also involves subjecting a polymer to a treatment to impart predetermined thermal shrink characteristics to result in a polymer shrink film having shrink film properties prior to treating the polymer film to result in a reduced or low kinetic film-to-film coefficient of friction, as described above, but most preferably wherein such treating involves plasma modification of the polymer shrink film with a plasma material.

The present invention is also directed to a process for making a shrink film having a predetermined coefficient of friction wherein the polymer film is a biaxially oriented polymer film, which the preferably imbalance of shrinkage consisting essentially of a machine direction (MD) shrinkage greater than a transverse direction (TD) shrinkage in a machine direction shrinkage/transverse direction shrinkage ratio of at least about 2:1, and wherein the MD shrinkage and the TD shrinkage are functions of temperature as follows:

| Shrinkage MD (%) | Shrinkage TD (%) | Shrink Test Temperature °C. |
|---|---|---|
| 4 to 15 | −6 to 5 | 100 |
| 6 to 25 | −8 to 7 | 110 |
| 10 to 30 | −10 to 10 | 120 |
| 12 to 40 | −12 to 15 | 130 |
| 20 to 40 | −15 to 15 | 140 |
| 20 to 40 | −20 to 15 | 150; and/or | the polymer shrink film exhibits tensile properties in each of the following six ranges of parameters:

| Modulus | |
|---|---|
| MD, psi | 350,000–850,000 |
| MD, psi | 100,000–500,000 |
| Tensile Strength | |
| MD, psi | 30,000–50,000 |
| MD, psi | 15,000–35,000 |
| Ultimate Elongation | |
| MD, % | 20–120 |
| TD, % | 50–250 |

Related to this, the present invention is also directed to a process for making a shrink film having a predetermined coefficient of friction, preferably wherein the polymer shrink film is a biaxially oriented polymer shrink film, and the process involves subjecting polymer film having the predetermined coefficient of friction, to processing conditions and temperature effective to produce a polymer shrink film having thermal shrink properties comprising shrinkage in the machine direction of said film and transverse direction of said film as a function of the MD orientation mechanical machine direction shrinkage/transverse direction shrinkage draw ratio.

The present invention is directed to a process for making a shrink film having a predetermined coefficient of friction, preferably wherein the shrink film is a biaxially oriented polymer shrink film, and the process involves subjecting a polymer film having such a predetermined coefficient of friction to processing conditions and temperature effective to produce biaxially oriented polymer shrink films having thermal shrink properties comprising shrinkage in the machine direction of said film and transverse direction of said film as a function of temperature.

Also related to this, the present invention is directed to a process for making a shrink film having a predetermined coefficient of friction, preferably wherein the shrink film is a biaxially oriented polymer shrink film, and the process involves heating a polymer film to a temperature within the temperature range of 100° C. to about 180° C.; drawing the heated film under conditions effective to extend the heated film by at least 1.05 times the original length of film in the machine direction; and cooling the drawn film while the drawn film is under tension, whereby a shrink film is produced having thermal shrinkage properties which are a function of temperature.

In addition to the foregoing, the present invention is directed to a shrink film including a polymer film having a kinetic film-to-film coefficient of friction within the range of 0.05 and 0.40, and an imbalance of shrinkage consisting essentially of a machine direction (MD) shrinkage greater than a transverse direction (TD) shrinkage in a machine direction shrinkage/transverse direction shrinkage ratio of at least about 2:1.

The present invention is also directed to a process for producing a laminate film, wherein the process involves forming a plurality of polymer films into a laminate comprising at least one polymer shrink film having a kinetic film-to-film coefficient of friction within the range of about 0.05 to about 0.40, and having an imbalance of shrinkage consisting essentially of a machine direction (MD) shrinkage greater than a transverse direction (TD) shrinkage; and a shrink film laminate which includes at least one polymer shrink film having a kinetic film-to-film coefficient of friction within the range of about 0.05 to about 0.40, and having an imbalance of shrinkage consisting essentially of a machine direction (MD) shrinkage greater than a transverse direction (TD) shrinkage.

The present invention is also directed to a process for applying a shrink film having a reduced coefficient of friction to an article which involves providing at least one polymer shrink film having a kinetic film-to-film coefficient of friction within the range of about 0.05 to about 0.40, and having an imbalance of shrinkage consisting essentially of a machine direction (MD) shrinkage greater than transverse direction (TD) shrinkage; covering at least a portion of an article with at least one polymer shrink film to produce at least partially covered articles; subjecting the at least partially covered articles to heat at a temperature sufficient to shrink the at least one polymer shrink film around at least a portion of the article; and filling articles with material at a filling rate within the range of about 100 to about 2,500 articles per minute to produce filled articles. For this embodiment, the article may have an irregular shape, and is preferably a container, and more preferably is a container selected from the group consisting of cans and bottles. Preferably, for purposes of this embodiment of the present invention, the container is at least partially covered with the polymer shrink film having a kinetic film-to-film to efficient of friction within the range of about 0.05 to about 0.40 prior to filling the container.

The present invention is also directed to an article at least partially covered with at least one shrink film having a kinetic film-to-film coefficient of friction within the range of about 0.05 to about 0.40, and having an imbalance of shrinkage consisting essentially of a machine direction (MD) shrinkage greater than a transverse direction (TD) shrinkage.

For the shrink film, laminates of shrink film, and processes for producing the same, articles at least partially covered with such shrink film or laminates including such shrink films, and process for the labeling or packaging article using such shrink film or laminates, the MD shrinkage and the TD shrinkage of the shrink film are functions of temperature as follows:

| Shrinkage MD (%) | Shrinkage TD (%) | Shrink Test Temperature °C. |
|---|---|---|
| 4 to 15 | −6 to 5 | 100 |
| 6 to 25 | −8 to 7 | 110 |
| 10 to 30 | −10 to 10 | 120 |
| 12 to 40 | −12 to 15 | 130 |
| 20 to 40 | −15 to 15 | 140 |
| 20 to 40 | −20 to 15 | 150; | and the shrink film may also exhibit tensile properties in each of the following six ranges of parameters:

| Modulus | |
|---|---|
| MD, psi | 350,000–850,000 |
| MD, psi | 100,000–500,000 |
| Tensile Strength | |
| MD, psi | 30,000–50,000 |
| MD, psi | 15,000–35,000 |
| Ultimate Elongation | |
| MD, % | 20–120 |
| TD, % | 50–250. |

For purposes of the present invention, the polymer shrink film may be selected from the group consisting of clear films and opaque films; the film may also be selected from the group consisting of monolayer films, multilayer films, coextruded films, extrusion coated films and coated films. The polymer shrink films of the present invention are composed of polyolefins, such as polypropylene. Preferably the polymer shrink film has a thickness within the range of about 50 to about 200 gauge, and more preferably within the range of about 70 to about 140 gauge. Most preferably, for purposes of the present invention as described herein, the polymer is a biaxially oriented polymer shrink film.

Thus, the present invention is directed to polymer shrink films and most preferably biaxially oriented polymer shrink films, such as polyolefin films, and laminates thereof with unique thermal shrink characteristics and a reduced or low coefficient of friction.

The present invention is advantageous in that the useful properties common for oriented polyolefin films are essentially maintained while lowering the coefficient of friction of the shrink film and providing thermally shrinkable polyolefin films and laminates which are useful as labeling and packaging materials, particularly using high speed filling labeling, and packaging procedures. In accordance with the present invention, although the thermal shrink properties of the novel polymer shrink films and laminates of the present invention differ from conventional oriented polymer films, the useful characteristics of oriented polymer film is maintained while imparting a kinetic film-to-film coefficient of friction thereto.

DESCRIPTION OF THE DRAWINGS

Other objects and many attendant features of this invention will become readily appreciated as the same becomes better understood by reference to the following detailed description when considered in connection with the accompanying drawings wherein:

FIG. 5 is a schematic illustration showing a process for coating a shrink film or laminate.

DETAILED DESCRIPTION OF THE PREFERRED EMBODIMENTS

Figure 1:
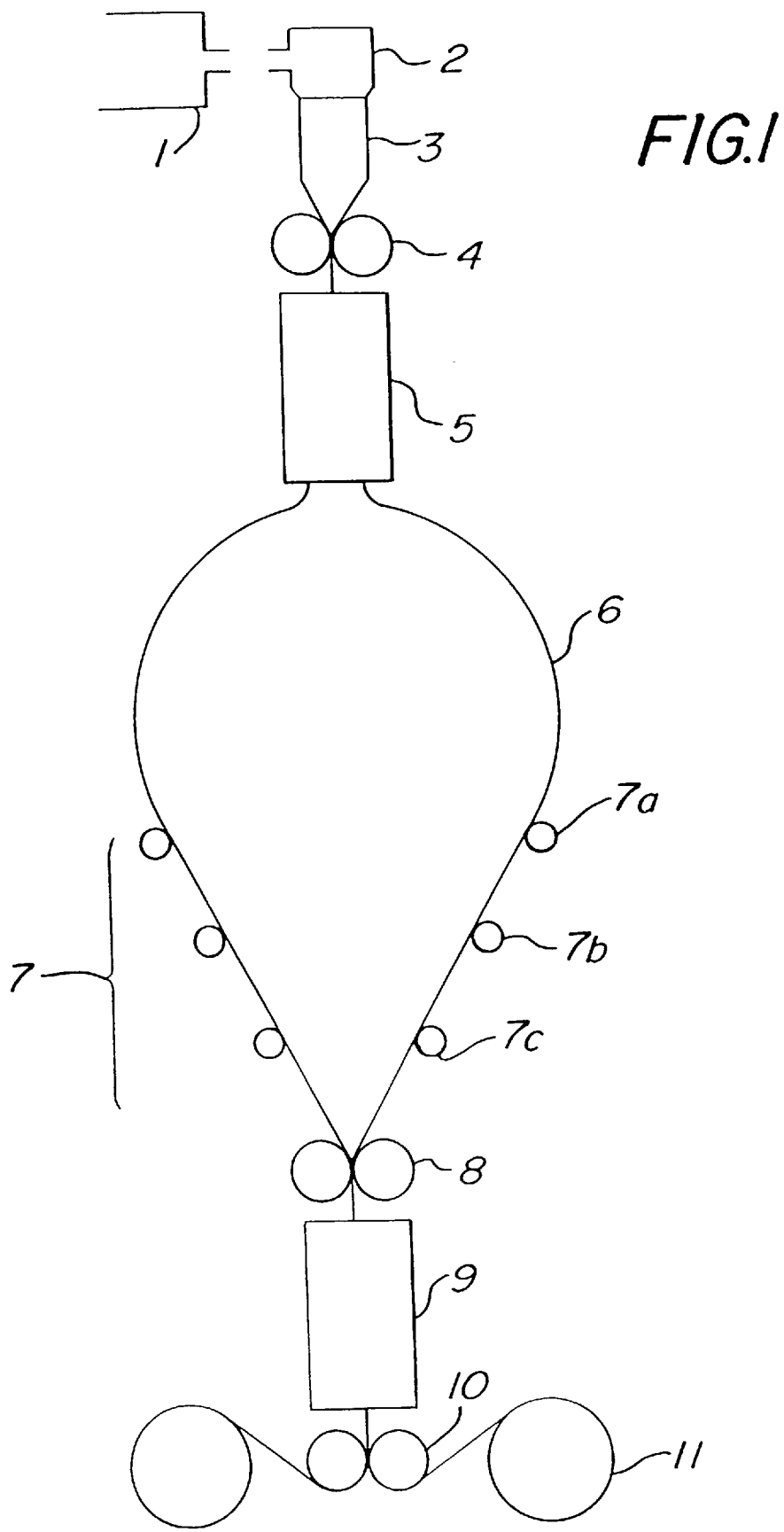
FIG. 1 is a schematic illustration showing a sequential blown film process for making shrink film.

One aspect of the present invention is based on the discovery of temperature, machine draw parameters and film parameters that allow for control of resultant shrinkage of a polymer film. More particularly, by achieving a balance of temperature, draw ratio, line speed, and oriented polymer film properties, the new process of the present invention is able to produce enhanced machine direction (MD) shrinkage with a very low degree of transverse direction (TD) shrinkage. This balancing of MD and TD shrinkage, particularly in oriented polypropylene (OPP) films, imparts the unique shrink label and packaging characteristics of the present invention.

The present invention is directed to a process for making a shrink film having a predetermined coefficient of friction which, in general, involves subjecting a polymer film selected from the group consisting of a single polymer film and a laminate of at least two polymer films to a treatment under conditions and time sufficient to produce a polymer shrink film having a reduced kinetic film-to-film coefficient of friction of less than about 0.55, i.e., within the range of greater than about 0.40 to about 0.55, and preferably a low kinetic film-to-film coefficient of friction of equal to less than about 0.40, i.e., within the range of about 0.05 to about 0.40.

In accordance with the present invention, such a treatment is a technique which is preferably selected from the group of treatment techniques consisting of migration of a slip agent, extrusion of a polymer film with a slip agent, coextrusion of a polymer film with a slip agent and extrusion coating a polymer substrate to produce a polymer film comprising a slip agent, direct coating of a polymer film with a material comprising a slip agent, plasma modification of a polymer film, and providing a hard coating on a polymer film.

Regarding the use of a slip agent, the preferred procedures in accordance with the present invention for effecting the preferred kinetic film-to-film coefficient of friction within the range of about 0.05 to about 0.40 are selected from the group consisting of migration of a slip agent, extrusion of a polymer film with a slip agent, and direct coating of a polymer film with a coating comprising a slip agent.

Although the present invention may be described in terms of a polymer film or polymer film layer, the present invention is also applicable to a plurality of layers of polymer film, so that the invention should not be narrowly construed to be limited to a single layer polymer film where so stated herein. Thus, the present invention as described herein is applicable to monolayer films, multi-layer films, extruded films, coextruded films, extrusion coated films, and other coated films.

For purposes of certain embodiments of the present invention, slip agents may be selected from the group consisting of fatty acids, fatty amides, waxes, polysiloxanes, and particulate which may be either incorporated into or coated on the film surface so as to ultimately at least partially cover the film surface with the slip agent.

Included among fatty acids as suitable slip agents for purposes of the present invention are saturated carboxylic acids, unsaturated carboxylic acids and fatty acid esters, for example, fatty acid glycerides. Included among fatty amides as suitable slip agents for purposes of the present invention are saturated carboxylic acid amides, unsaturated carboxylic acid amides, substituted amides, simple fatty acid amides, and substituted fatty acid amides.

For purposes of the invention saturated carboxylic acids may be selected from the group consisting of long chain saturated fatty acids having about 4 to about 26 carbon atoms. Examples include butyric acid, caproic acid, enanthic acid, caprylic acid, pelargonic acid, capric acid, lauric acid, myristic acid, palmitic acid, stearic acid, arachidic acid, behenic acid, liguoceric acid, and cerotic acid.

Unsaturated carboxylic acids suitable for purposes of the present invention may be selected from the group consisting of long chain unsaturated fatty acids having 8 to about 26 carbon examples of myristoleic acid, palmitoleic acid, oleic acid, elaidic acid, linoleic acid, α-linolenic acid, licanic acid, α-eleostearic acid, β-eleostearic acid, ricinoleic acid, and erucic acid.

The saturated and unsaturated fatty acids described above can be formed into derivatives such as glycerides or esters which are also suitable for the purposes of the invention. Examples include glycerol monobehem and glycerol monostearate.

Unsaturated carboxylic acid amides suitable for purposes of the present invention may be selected from the group consisting of long chain saturated fatty acid amides having about 8 to about 26 carbon atoms. Examples include myristoleamide, palmitoleamide, oleamide, elaidamide, linoleamide, α-linolenamide, licanamide, α-eleostearamide, β-eleostearamide, ricinoleamide, and erucamide.

Saturated carboxylic acid amides suitable for purposes of the present invention may be selected from the group consisting of long chain saturated fatty acid amides having about 4 to about 26 carbon atoms. Examples include butyramide, caproamide, enanthamide, caprylamide, pelargonamide, capramide, lauramide, myristamide, palmitamide, stearamide, arachidamide, behenamide, liguoceramide, and cerotamide.

Substituted amides are suitable for purposes of the present invention. Examples include N-oleyl oleamide, N-erucyl stearamide, N-stearyl erucamide, N-stearyl stearamide, N-oleyl palmitamide, and N-erucyl erucamide.

Simple fatty acid amides are suitable for purposes of the present invention. Examples include coco fatty amides sold under the tradename of Armid C by Armak Co., and Adogen 60 by Ashland; hydrogenated-tallow fatty amide sold under the tradename Armid HT by Armak Co., and Adogen 40 by Ashland.

Substituted fatty acid amides are suitable for purposes of the present invention. Examples include polyoxyethylated amides with the general formula as indicated in (1), such as polyoxyethylated octadecenamide sold under the tradename of Ethomid O/15 by Armak:

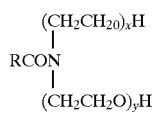

where x+y=5; polyoxyethylated hydrogenated tallow fatty acid amide where x+y=5 sold under the tradename of Ethomid HT/15 by Armak; polyoxyethylated hydrogenated tallow fatty acid amide where x+y=50 sold under the tradename of Ethomid HT/60 by Armak; N,N-bis(2-hydroxyethyl) dodecanamide sold under the tradename of Ninol AA62 Extra by Stephen; N,N-bis(2-hydroxyethyl) coco fatty acid amide sold under the tradename of Ninol 2021 Extra by Stephen; N-(2-hydroxypropyl) dodecanamide sold under the tradename of Ninol AD31 by Stephen; sodium salt of octadecenylpeptide sold under the tradename of Maypon K by Maywood; N-methyl-N-(1-oxododecyl)-glycine sold under the tradename of Sarkosyl L by Geigy; N-methyl-N-(1-oxooctadecyl)-glycine sold under the tradename of Sarkosyl S by Geigy; N-methyl-N-(1-oxooctadecenyl)-glycine sold under the tradename of Sarkosyl O by Geigy; sodium N-acyl-N-methylamine ethylsulfonates from coco fatty acids sold under the tradename of Igepon TC-42 by G.A.F.; sodium N-acyl-N-methylamine ethylsulfonates from tallow fatty acids sold under the tradename of Igepon TE-42by G.A.F.; sodium N-acyl-N-methylamine ethylsulfonates from octadecanoic acid sold under the tradename of Igepon T-77 by G.A.F.; sodium N-acyl-N-methylamine ethylsulfonates from hexadecanoic acid sold under the tradename of Igepon TN-71 by G.A.F.; N,N-dimethylhexanamide sold under the tradename of Hallcomid M-6 by Hall; N,N-dimethyl-dodecanamide sold under the tradename of Hallcomid M-12 by Hall; N,N-dimethyl-octadecanamide sold under the tradename of Hallcomid M-18 by Hall, N,N-dimethyl-octadecenamide sold under the tradename of Hallcomid M-18-OL by Hall; 1,2-ethanediylbis octadecanamide sold under the tradenames of Acrawax C by Glyco, Kemamide W40 by Humko and Armowax by Armak; 1,2-ethanediylbis octadecenamide sold under the tradename of Kemamide W20 by Humko.

Preferred are the long chain fatty acid amides having about 12 to about 22 carbon atoms. More preferred are erucamide, oleamide, stearamide, and behenamide.

Waxes are suitable for purposes of the present invention. Examples include vegetable waxes, mineral waxes, and synthetic waxes.

Vegetable waxes are suitable slip agents for purposes of the present invention. Examples include candelilla wax, carnauba wax, Japan wax, rice-bran wax, jojoba oil, and jojoba wax.

Mineral waxes are suitable slip agents for purposes of the present invention. Examples include montan wax, petroleum wax, paraffin wax, semimicrocrystalline wax, microcrystalline wax, and polymethylene (Fischer-Tropsch) wax.

Synthetic waxes are suitable slip agents for purposes of the present invention. Examples include polyethylene wax, polymethylene (Fischer-Tropsch) wax, chemically modified hydrocarbon wax, oxidized wax, oxidized polyethylene wax, polyethylene copolymer wax, and substituted amide wax.

Insect waxes may also be used as slip agents and a preferred insect wax for purpose of the slip agent of the present invention is beeswax.

Preferred waxes are migratory waxes, such as paraffinic hydrocarbon waxes, most preferred of which is polymethylene wax, such as a Fischer-Tropsch wax, which is sometimes referred to as an R.G. wax. A Fischer Tropsch wax has a boiling point of above about 600° F., a vapor pressure (mmHg) less than about 1, a vapor density (Air=1) of greater than about 1, a melting point of about 205° F. and weighs approximately 7.8 pounds per gallon at 77° F., and has a negligible solubility in water.

Other suitable slip agents for purposes of the present invention may be selected from the group consisting of polysiloxanes and particulate.

For purposes of the present invention, preferred polysiloxane slip agents may be selected from the group consisting of dimethyl polysiloxane, alkyl modified siloxanes, arylalkyl modified siloxanes, and silicone resin microspheres.

The coefficient of friction of film surfaces may also be adjusted in accordance with the present invention by treatment with certain particulate. Preferred particulate for purposes of the present invention may be selected from the group consisting of silica, synthetic amorphous silica, synthetic amorphous silica plus citric acid, and polytetrafluoroethylene powder.

Migration of Slip Agent

One embodiment of the present invention involves incorporating a slip agent into the film which is capable of exuding or migrating to the surface over time or assisted or otherwise driven by heat.

Migration of a slip agent to the surface of a polymer film can occur when the slip agent is incompatible with the film or if the slip agent is present at a concentration which is in excess of its solubility in the film. The slip agent will tend to migrate, exude, or bloom to the surface. Once at the film surface, it exerts a favorable influence by lowering the frictional force needed to cause relative motion between the film and, for example, another film surface, a metal roller, or a polyethylene guide rail. If the slip agent concentration is high, its solubility in the film very low, and/or diffusion of the slip agent in the polymer rapid, then the slip agent may bloom to the film surface at an acceptable rate at ambient temperature.

It is most preferred that a slip agent be incorporated such that a significant reduction in film-to-film kinetic coefficient of friction will occur after a period of up to about 72 hours has elapsed at about 25° C. Sometimes this requires that a relatively low molecular weight slip agent be selected and/or it be present at high concentrations. If its concentration is too high, the optical properties of a clear film may be degraded. If the slip agent molecular weight is too low, it may be too volatile at the high temperatures required to melt and process polymers which make up the film and cause difficulties in extrusion and orientation steps. If the slip agent solubility in the film is very low or its diffusivity too high, then it may be difficult to disperse the slip agent in the polymer with good uniformity.

For these reasons, higher molecular weight slip agents are often used.

Since their rate of blooming at room temperature is greatly reduced, elevated temperatures are usually used to accelerate their appearance at the film surface.

Heat Driven Migration of a Slip Agent

Another way to reduce COF is with a film additive which migrates to the surface upon exposure to heat.

However, if the film is a thermally activated shrink film or laminate, it is desirable that the temperature at which migration takes place be below the temperature at which film shrinkage occurs to a significant extent. This is necessary so that, if wound into a roll, the winding tension augmented by the shrink tension does not become so high that the roll tightens and the film blocks or, once unwound, the film retains desirable properties needed to function properly in a shrink labeling application.

It is most preferred that the temperature required for heat driven migration range from about 35° C. to about 65° C. and the heat exposure time range from about 6 hours to about 48 hours. The film can be heated in any suitable electrically heated, gas fired, or steam heated oven or chamber, as is well known to those skilled in the art. Incorporation of an effective slip agent will give a significant reduction in film-to-film kinetic coefficient of friction (COF) after exposure to these migration conditions without significantly altering the beneficial shrink properties of a shrink film or lamination.

Example I-1A shows this for a monolayer film containing a migratory hydrocarbon wax. The shrink film can be heat treated to give a low COF film with shrink properties suitable for labeling containers in a later production operation. A lamination of two shrink films with a low COF outer clear surface is also possible (Example I-1B).

An alternative method leading to migration or exuding of the slip agent to a shrink film surface proceeds as follows. The shrink film or lamination is first used to label an article by thermally activating the shrink property incorporated into the film or lamination. Thermal exposure equal to or in excess of that required to cause shrinkage can cause the slip agent to migrate to the surface of the film or laminate-labeled article, imparting a beneficial reduction in film-to-film kinetic coefficient of friction to the shrink labeled article. This could be useful if one article is required to slide on another article or on a metal or polyethylene guide such as would be encountered in a high speed article filling and packaging line. Any excess thermal exposure required should occur above ambient temperature but below the melting point of the film or lamination. Preferably, any excess thermal exposure should occur above about 40° C. More preferably, any excess thermal exposure should occur about above 65° C. Most preferably, any excess thermal exposure should occur above about 100° C.

Extrusion of a Polymer Shrink Film with a Slip Agent Followed by Migration

A slip additive present at the surface of a shrink film or lamination can give a low coefficient of friction shrink film. This result can be achieved by causing migration of the slip agent after the shrink film is formed. Such a slip additive may be selected from a polysiloxane, a wax, a fatty amide, a fatty acid, or a combination of any or all of the above. More preferably, the slip agent is a mineral or synthetic wax, a long chain fatty acid amide having about 12 to about 22 carbon atoms, or a combination of the above. Most preferably, the slip agent is a polymethylene wax, erucamide, oleamide, stearamide, or behenamide.

The slip agent should impart a desirable low film-to-film kinetic coefficient of friction to at least one side of the final shrink film while not interfering with the ability to orient the extruded or coextruded or extrusion coated sheet into a shrink film.

For the purposes of this invention, it is preferred that the slip agent be present at concentrations of about 0.10 to about 2.0 phr.

Although not wishing to be bound by any particular theory, the slip agent is thought to reduce the film-to-film kinetic coefficient of friction by migrating to the surface and acting as a lubricant on the surface of the shrink film. The composition of the skin layer polymer or copolymer is important for maintaining an adequate amount of nonparticulate slip agent at the surface of films throughout conditions under which the film may be used as is well known to those skilled in the art.

The polyolefin in a monolayer film is preferably a homopolymer, although copolymers of propylene with minor amounts of ethylene or an olefin can also be used. Typical commercially available film-forming propylene homopolymers are crystalline or isotactic in their molecular structure with a density from about 0.83 to about 0.98 g/cc and preferably within the range of about 0.86 to 0.92 g/cc measured at 23° C. according to ASTM D1505 and have a melt flow index of about 1 to about 15 g/10 min. and preferably within the range of about 2 to about 15 g/10 min. The propylene is compounded with conventional additives such as antioxidants, light stabilizers and organic or inorganic materials such as calcium oxide, magnesium aluminum hydroxide carbonate hydrate or calcium stearate, in addition to any other desired additives, such as a slip agent or slip agents.

The mixtures of polyolefins and additives which are employed in making the shrink films of this invention are physical mixtures which are readily prepared by conventional methods of mixing and blending employed in the plastics art. Preferably, the mixture of polyolefins and additives is at least about 70% by weight polyolefin.

Since the film is a thermally activated shrink film or laminate, it is preferred that the temperature at which migration takes place be below the temperature at which film shrinkage occurs to a significant extent. It is more preferred that the temperature required for this heat driven migration ranges from about 35° C. to about 65° C., and the heat exposure time ranges from about 6 hours to about 48 hours.

It is most preferred that the temperature ranges from about 45° C. to about 60° C., and the heat exposure time ranges from about 6 to about 26 hours. These migration conditions will give a significant reduction in film-to-film kinetic coefficient of friction without significantly altering the beneficial shrink properties of a shrink film or lamination.

The following examples are representative of such a migration of slip agents.

EXAMPLE I-1A

A film is made by extruding an isotactic polypropylene homopolymer (Himont Profax 6501) of melt flow index 4.5 g/10 min at condition 230° C./2.16 kg by method ASTM D1238-82. The extrudate contains an antacid, such as 0.1 phr calcium stearate, an antioxidant, such as 0.1 phr Ethanox 330 (Ethyl Chemical), 10.8% hydrogenated hydrocarbon resin modifier, such as Regalrez® 1128 or Regalrez® 1139 (Hercules Incorporated) 0.3 phr total particulate, such as Kaophile-2 (Georgia Kaolin) or Kaopolite SFO (Antor Inc.) or a blend thereof, and a hydrocarbon wax, such as 1 phr RG wax (Moore & Munger Marketing). A layer is extruded at 245° C., quenched, reheated in an oven and drawn about 7 times in the machine direction and about 7 times in the transverse direction in a tubular process at a maximum temperature of 155° C. with an overpressure of 3 inches of water. After cooling, the film is drawn again 1.21 times in the machine direction at about 112° C. The film is wound up into a mill roll and placed in a 52° C. hot air oven for 24 hours. Upon removal, the film has a film-to-film kinetic COF of 0.28 and film-to-stainless steel kinetic COF of 0.24. The film has MD shrinkage of 20% and TD shrinkage of 12% at 140° C.

EXAMPLE I-1B

The shrink film of Example I-1A is laminated to an opaque shrink film. The clear side of the lamination has film-to-film kinetic COF of 0.29 and film-to-stainless steel kinetic COF of 0.23. The lamination has MD shrinkage of 25% and TD shrinkage of −1.5% at 140° C.

Coextrusion or Extrusion Coating of a Polymer Shrink Film with a Slip Agent Followed by Migration The present invention may also be accomplished by forming a multilayer film made by coextrusion or extrusion coating.

A slip additive present at the surface of a shrink film or lamination can give a low coefficient of friction shrink film. This result can be achieved by causing migration of the slip agent after the shrink film is formed. Another way of achieving this is by placing a slip agent, such as a particulate, on a film surface.

The slip additive could be a polysiloxane, a wax, a fatty amide, a fatty acid, a particulate, or a combination of any or all of the above. This result can also be achieved by using a combination of including a migratory slip agent within the film and applying a non-migratory slip additive to a surface of the film. In such embodiment, a long chain fatty acid amide having about 12 to about 22 carbon atoms, and a silica particulate, respectively, are preferred. Most preferably, the long chain fatty acid amide is selected from the group consisting of erucamide, oleamide, stearamide, or behenamide, and the silica particulate is a silica or synthetic amorphous silica particulate with about 2 to about 7 μm mean particle size.

The slip agent should impart a desirable low film-to-film kinetic coefficient of friction to at least one side of the final shrink film while not interfering with the ability to orient the extruded or coextruded or extrusion coated sheet into a shrink film.

For purposes of this invention, it is preferred that the fatty acid amide slip agent be present at concentrations of about 0.10 to about 0.5 phr and that the silica particulate slip agent be present at concentrations of about 0.05 to about 0.25% by weight.

The slip agent can be incorporated into a single layer of polymer. Preferably, the base film layer may be covered with a thinner outer skin layer different in composition or in molecular weight than the base layer. The skin layer is preferably a polyolefin copolymer or terpolymer with propylene as the major component and other olefins, such as ethylene, butene, or hexene, as minor components. The skin layer more preferably is a copolymer of propylene with ethylene. Preferably, the skin layer is a copolymer of propylene and ethylene with no more than about 7% ethylene by weight and most preferably with no more than about 5% ethylene by weight. There can be an outer skin layer on one or both sides of the base layer. More preferably, the skin layer is on one side of the base layer. The skin layer can be formed by coextrusion of the base layer and the skin layer or extrusion coating the base layer with the skin layer by methods well known to those skilled in the art. Preferably, the skin layer is coextruded with the base layer.

The slip agent can be present in the skin layer, the base layer, or in both layers. The silica particulate slip agent is preferably present in the skin layer or layers of a multilayer film. The fatty amide is preferably present in the base layer of a multilayer film.

Although not wishing to be bound by any particular theory, the skin layer is thought to produce a low film-to-film kinetic coefficient of friction of a shrink film or lamination by allowing the silica particulate slip agent to protrude from the surface of the film and reduce the area of the film in contact with another film surface. It may also contribute useful antiblock properties. The fatty amide slip agent is thought to reduce the film-to-film kinetic coefficient of friction by migrating to the surface and acting as a lubricant on the surface of the shrink film. The composition of the skin layer polymer or copolymer is important for maintaining an adequate amount of nonparticulate slip agent at the surface of films throughout conditions under which the film may be used, as is well known to those skilled in the art.

The polyolefin core layer of a multilayer film is preferably homopolymer, although copolymers of propylene with minor amounts of ethylene or an olefin can also be used. Typical commercially available film-forming propylene homopolymers are crystalline or isotactic in their molecular structure with a density from about 0.83 to about 0.98 g/cc and preferably within the range of about 0.86 to 0.92 g/cc measured at 23° C. according to ASTM D1505 and have a melt flow index of about 1 to about 15 g/10 min. and preferably within the range of about 2 to about 15 g/10 min. The propylene is compounded with conventional additives such as antioxidants, light stabilizers and organic or inorganic antacids such as calcium oxide, magnesium aluminum hydroxide carbonate hydrate or calcium stearate, in addition to any other desired additives, such as a slip agent or slip agents.

The mixtures of polyolefins and additives which are employed in making the shrink films of this invention are physical mixtures which are readily prepared by conventional methods of mixing and blending employed in the plastics art. Preferably, the mixture of polyolefins and additives is at least 70% by weight polyolefin.

Since the film is a thermally activated shrink film or laminate, it is preferred that the temperature at which migration takes place be below the temperature at which film shrinkage occurs to a significant extent. It is more preferred that the temperature required for this heat driven migration range from about 35° C. to about 65° C. and the heat exposure time range from about 6 hours to about 48 hours.

It is most preferred that the temperature ranges from about 45° C. to about 60° C. and the heat exposure time ranges from about 6 to about 15 hours. These migration conditions will give a significant reduction in film-to-film kinetic coefficient of friction without significantly altering the beneficial shrink properties of a shrink film or lamination.

Example I-2A illustrates this for a film composition of an ethylene-propylene copolymer layer coextruded with a polypropylene base containing a fatty amide migratory slip additive (behenamide). This structure is biaxially oriented by the bubble process, drawn again in the MD to give desired shrink properties, then heated to give a shrink film with low COF. A lamination of two shrink films with a low COF outer clear surface Example I-2B) can also be made with this multilayer shrink film.

EXAMPLE I-2A

A film is made by coextruding an isotactic polypropylene homopolymer (Himont Profax 6501) of melt flow index 4 g/10 min. at 230° C./2.16 kg by method ASTM D1238-82 with an outer layer of propylene-ethylene copolymer (Fina 8573) of melt flow index 7 g/10 min. at 230° C./2.16 kg and containing 3.6% by weight ethylene, such that the oriented film consists of about a 2 gauge outer layer on one side of about a 80 gauge core layer. The homopolymer polypropylene extrudate layer contains an antacid, such as 0.1 phr calcium stearate, and antioxidant, such as 0.12 phr Ethanox 330 (Ethyl Chemical), 9.5% hydrogenated hydrocarbon resin modifier, such as Regalrez® 1128 or Regalrez® 1139 (Hercules, Incorporated), 0.35 phr total particulate, such as Kaophile-2 (Georgia Kaolin) or Kaopolite SFO (Antor Inc.) or a blend thereof, and a slip agent, such as 0.3 phr Kemamide B (Witco Chemical). The copolymer extrudate contains 0.1% by weight of particulate, such as Syloid 244FP (W. R. Grace & Co.). The two layers are coextruded at 245° C., quenched, reheated in an oven and drawn about 6.9 times in the machine direction and about 6.7 times in the transverse direction in a tubular process at a maximum temperature of 155° C. with an overpressure of 4.5 inches of water. After cooling, the film is drawn again 1.18 times in the machine direction at about 115° C. The film is wound up into a mill roll and placed in a 55° C. hot air oven for 12 hours. Upon removal, the outer layer side has a film-to-film kinetic COF of 0.15 and film-to-stainless steel kinetic COF of 0.13. The film has MD shrinkage of 22%, and TD shrinkage of 7% at 140° C.

EXAMPLE I-2B

The coextruded and drawn and drawn again shrink film of Example I-2A is laminated to an opaque shrink film with the outer layer of the clear film facing away from the adhesive. The laminated roll is placed in a 55° C. hot air oven for 48 hours. Upon removal, the outer layer side of the lamination has film-to-film kinetic COF of 0.28 and film-to-stainless steel kinetic COF of 0.17. The lamination has MD shrinkage of 24% and TD shrinkage of 1% at 140° C.

Extrusion of a Polymer Shrink Film with Desired COF

An alternative route to a low COF shrink film is to begin by producing a film having desirable COF properties then performing a final machine direction (MD) drawing step as described in more detail hereinafter.

This gives a final film with enhanced shrink properties for container labeling while maintaining suitable COF properties. Since the MD drawing step requires exposure to elevated temperatures, the useful COF properties should not be adversely effected during the additional drawing step. This can be accomplished by incorporating additives such as polysiloxanes into a monolayer film or into a thin layer on the surface of a multilayer film.

Although not wishing to be bound by any particular theory, these additives prefer to reside at the film surface and remain there during the heating encountered during additional MD drawing. Their presence at the film surface serves to lower its COF.

A slip additive, present at the surface of the film after extrusion and preferably, orientation steps, is needed to achieve a low coefficient of friction shrink film. Such a slip additive could be a polysiloxane, a particulate, a fatty amide, a fatty acid, or a combination of any or all of the above. More preferably, the slip agent is a polysiloxane, a particulate, or a lower molecular weight fatty amide, or a combination of any or all of the above. Most preferably, the slip agent is a polydimethyl siloxane with viscosity below about 10,000 cSt., a silica or synthetic amorphous silica particulate with about 2 to about 7 µm mean particle size, erucamide, or oleamide, or a combination of any or all of the above.

For purposes of this invention, it is preferred that the polysiloxane slip agent be present at concentrations of about 0.05 to about 0.5 phr and that the silica particulate slip agent be present at concentrations of about 0.05 to about 0.5% by weight, and preferably about 0.1 to about 0.4% by weight.

The slip agent should impart a desirable low film-to-film kinetic coefficient of friction to at least one side of the final shrink film while not interfering with the ability to orient the extruded or coextruded or extrusion coated sheet into a shrink film. If excessive quantities of the slip agent are present, the slip agent may promote slippage of the film at the rolls or clips used to draw the film and make achieving the desired draw ratio difficult. Excessive quantities of the slip agent may plate out on surfaces in contact with the film during manufacture, leading to production inefficiencies.

The slip agent can be incorporated into a single layer of polymer. Preferably, the base film layer may be covered with a thinner outer skin layer different in composition or in molecular weight than the base layer. The skin layer is preferably a polyolefin copolymer or terpolymer with propylene as the major component and other olefins, such as ethylene, butene, or hexene, as minor components. The skin layer more preferably is a copolymer of propylene with ethylene. Most preferably, the skin layer is a copolymer of propylene and ethylene with no more than about 7% ethylene by weight. There can be an outer skin layer on one or both sides of the base layer. More preferably, the skin layer is on one side of the base layer. The skin layer can be formed by coextrusion of the base layer and the skin layer or extrusion coating the base layer with the skin layer by methods well known to those skilled in the art. Preferably, the skin layer is coextruded with the base layer.

The slip agent can be present in the skin layer, the base layer, or in both layers. Polysiloxane and particulate slip agents are preferably present in the skin layer or layers of a multilayer film. Fatty acids or fatty amides are preferably present in the base and skin layers of a multilayer film.

Although not wishing to be bound by any particular theory, the skin layer is thought to produce a low film-to-film kinetic coefficient of friction of a shrink film or lamination by allowing particulate slip agent to protrude from the surface of the film and reduce the area of the film in contact with another film surface. It may also contribute useful antiblock properties. A polysiloxane or fatty amide slip agent is thought to reduce the film-to-film kinetic coefficient of friction by acting as a lubricant on the surface of the shrink film. The composition of the skin layer polymer or copolymer is important for maintaining an adequate amount of nonparticulate slip agent at the surface of films throughout conditions under which the film may be used, as is well known to those skilled in the art.

The polyolefin in a monolayer film or the polyolefin core layer of a multilayer film is preferably homopolymer, although copolymers of propylene with minor amounts of ethylene or an olefin can also be used. Typical commercially available film-forming propylene homopolymers are crystalline or isotactic in their molecular structure with a density from about 0.83 to about 0.98 g/cc and preferably within the range of about 0.86 to 0.92 g/cc measured at 23° C. according to ASTM D1505 and have a melt flow index of about 1 to about 15 g/10 min., and preferably within the range of about 2 to about 15 g/10 min. The propylene is compounded with conventional additives such as antioxidants, light stabilizers and organic or inorganic antacids such as calcium oxide, magnesium aluminum hydroxide carbonate hydrate or calcium stearate, in addition to any other desired additives, such as a slip agent or slip agents.

The mixtures of polyolefins and additives which are employed in making the shrink films of this invention are physical mixtures which are readily prepared by conventional methods of mixing and blending employed in the plastics art. Preferably, the mixture of polyolefins and additives is at least 70% by weight polyolefin.

Example I-3 illustrates an example of a tentered film with low COF being formed into a low COF shrink film.

EXAMPLE I-3

A film is made by coextruding an isotactic polypropylene homopolymer (Himont Profax® 6501) of melt flow index 4 g/10 min. at 230° C./2.16 kg by method ASTM D1238-82 with an outer layer of propylene-ethylene copolymer (Fina Z9470) of melt flow index 4 g/10 min. at 230° C./2.16 kg and containing about 6% by weight ethylene such that the oriented film consists of about a 2 gauge outer layer on each side of about a 76 gauge core layer. The homopolymer polypropylene extrudate layer contains an antacid, such as 0.05 phr DHT-4A (Kyowa Chemical Industry Co.), an antioxidant, such as 0.3 phr Irganox® B-225 (Ciba-Geigy), and 3% hydrogenated hydrocarbon resin modifier, such as Regalrez® 1128 or Regalrez® 1139 (Hercules Incorporated). The copolymer extrudate contains an antacid, such as 0.1% by weight calcium stearate, an antioxidant, such as 0.1% by weight Ethanox® 330 (Ethyl Chemical), a second antioxidant, such as 0.05% by weight Irgafos® 168 (Ciba-Geigy), 0.3% by weight of a particulate, such as Syloid 244FP (W. R. Grace & Co.), 0.08% by weight Armostat® 310 (Akzo Chemical) and 3% by weight of a superslip masterbatch, such as Polybatch IL 2580SC (A. Schulman Inc.), which contains 10% by weight of a polysiloxane slip agent. The film layers are coextruded at 250° C., cast onto a 36° C. chrome chill roll, reheated with 122° C. preheat rolls, then drawn about 5 times in the machine direction followed by drawing about 10 times in the transverse direction in a tenter process at a maximum oven air temperature of 181° C. After cooling, the film is drawn again 1.12 times in the machine direction at about 112° C. The film is wound up into a mill roll. The outside layer has a film-to-film kinetic COF of 0.31 and film-to-stainless steel kinetic COF of 0.23. The film has MD shrinkage of 18.5% and TD shrinkage of −9% at 140° C.

Coating of Shrink Label Films or Laminations

Another way to reduce COF is to coat a shrink film or shrink film lamination with a coating.

Related to this, it is often desirable to achieve a polymer shrink film or lamination with a low coefficient of friction coating on at least one surface.

In one embodiment, a liquid coating is applied to at least one surface of a polymer shrink film. The liquid should contain at least one material known to function as a slip agent, which may be either migratory or nonmigratory. The slip agent should be chosen so as not to interfere with any curing and/or drying which may occur during the solidification process. The liquid could be in the form of a solution, either aqueous or in an organic solvent, a suspension, an emulsion, or a dispersion. The coating can be a polyamide, polyurethane, polyethyleneamine, nitrocellulose lacquer, shellac, nitrocellulose-modified polyamide, nitrocellulose-modified polyurethane, nitrocellulose-modified polyethyleneamine, or nitrocellulose-modified shellac. Preferred materials are nitrocellulose lacquers and nitrocellulose-modified polyamide over-lacquers or over-print varnish. Preferred slip agents are waxes, long chain fatty acid amides having about 12 to about 22 carbon atoms, silicon-containing particulate and polysiloxanes. The liquid can be applied by well known surface printing methods, such as direct and offset gravure, flexography, or with a doctor blade, Meyer rod or air knife. It may be necessary to prime and/or treat the surface to obtain adequate adhesion of the solidified liquid to the shrink film surface. The primers may be polyamides, polyurethanes, polyethyleneamine or a natural resin (shellac). The treatment may consist of exposing either or both sides of the film to an energy source, such as a flame, corona discharge, plasma, or an x-ray or electron bombardment.

The liquid is solidified by removing the solvent, usually by drying with heat. The residual material may undergo curing before, during or after the solvent removal is complete, depending upon its chemical nature. The curing could be oxidative in nature, such as is well known, for example, with alkyd resins. It is desirable to solidify the liquid under as low a temperature and for as short a time as possible so as not to alter the shrink properties of the film or lamination. It is preferable to maintain a film temperature below the melting point of the film, typically below 165° C. for oriented polypropylenebased films. However, the temperature must be sufficient so that the liquid coating can solidify by drying and/or curing at a rate rapidly enough for the process to be performed economically. More preferably, the web temperature is within the range of about 100° F. to about 200° F. and the time is within the range of about 0.1 seconds to about 2 hours.

It is preferred that the solidified coating be of the temperature resistant type, i.e., to temperatures up to about 150° C., so that the favorable COF properties it imparts be maintained at elevated temperatures which might be experienced during shrinking the film or lamination or processing a labeled article through a filling line.

It is desirable that the solidified coating have a coat weight preferably within the range of about 0.4 to about 2 lb/ream, more preferably within the range of about 0.7 to about 1.5 lb/ream, most preferably within the range of about 0.7 to about 1.2 lb/ream.

The liquid coating could also be of the solventless type which is caused to solidify by exposure to radiation, such as ultraviolet, electron beam, x-rays or gamma rays. These methods are advantages in that this type of curing requires no equipment to handle solvent vapors. In addition, the shrink film or lamination need not be exposed to high temperatures to bring about the solidification. However, the liquid compositions amenable to curing by radiation are usually more costly.

Since the shrink film might be clear, the coating is also preferably clear to preserve the overall of a coated film. The side to be coated can be either clear or opaque, but is usually clear.

Example I-4A in Table I illustrates the reductions in film-to-film and film-to-stainless steel COF which can be achieved by this approach while maintaining favorable shrink properties for container labeling. This example is for a lamination of two shrink films which then has the outer layer coated with a slip coating. If desired, a single shrink film could be coated with the slip coating, as illustrated in Example I-4B, and used that way or be laminated to another shrink film to give a low COF shrink lamination suitable for container labeling.

Reference is made to FIG. 5, which can be used to schematically illustrate a film coating process, as is well known to those skilled in the art, wherein a low COF shrinkable label film or lamination is prepared by direct coating of one side of one roll of shrinkable label film or lamination 51 with a low COF overcoating 52, evaporating the solvent in an oven 53, then bringing the coated side into contact with a chill roll 55. The resulting roll of shrinkable label film or lamination 56 is then wound up.

EXAMPLE I-4A

A film is as made by extruding an isotactic polypropylene homopolymer (Himont Profax 6501) of melt flow index 4.5 g/10 min. at 230° C./2.16 kg by method ASTM D1238-82. The extrudate contains an antacid, such as 0.1 phr calcium stearate, an antioxidant, such as 0.1 phr Ethanox 330 (Ethyl Chemical), 7% hydrogenated hydrocarbon resin modifier, such as Regalrez® 1128 or Regalrez® 1139 (Hercules, Incorporated), and 035 phr total particulate, such as Kaophile-2 (Georgia Kaolin) or Kaopolite SFO (Antor Inc.) or a blend thereof. A layer is extruded at 245° C., quenched, reheated in an oven and drawn about 7 times in the machine direction and about 7 times in the transverse direction in a tubular process at a maximum temperature of 155° C. with an overpressure of 3 inches of water. After cooling, the film is drawn again 1.15 times in the machine direction at about 115° C. The film is wound up into a mill roll and then laminated to a roll of opaque shrink film.

A 20 inch wide roll 51 of shrinkable label lamination is mounted in the primary unwind stand of a Faustel printer-coater-laminator.

A low COF coating, Manders-J&B 41BG-33150, is diluted with a mixture of 60% propanol, 20% propyl acetate and 20% heptane until a #2 Zahn cup viscosity of 20 seconds is achieved. This coating solution 52 is placed into a reservoir 57 in contact with a 130 quad pattern gravure cylinder 58, chosen to deliver an adhesive coating weight of 1 lb/ream to the shrinkable lamination at 200 ft/min.

Solvent is evaporated from the coated film in a drying tunnel 53 maintained at 180° C. during a 3.5 second residence period. The tension in the film web is maintained at 0.75 lb/linear inch. The lamination contacts a chill roll 55 maintained at 70° F. and is then wound up as a roll 56 on a winding stand.

The coated side has a film-to-film kinetic COF of 0.23 and film-to-stainless steel kinetic COF of 0.16. The lamination has MD shrinkage of 20%, and TD shrinkage of 10% at 140° C.

EXAMPLE I-4B

The clear shrink film of Example I-4A before lamination is coated with a slip coating as in Example I-4A. The coated side has film-to-film kinetic COF of 0.16 and film-to-stainless steel kinetic COF of 0.24. The film has MD shrinkage of 19% and TD shrinkage of 9% at 140° C.

The shrink film or laminate surface has greatly reduced COF after drying and/or curing of the coating.

Hard Coating of Shrink Label Films or Laminations

Another embodiment of the present invention involves providing a hard coating in the film, i.e., on at least one surface. Since the shrink film might be clear, the coating is also preferably clear to preserve the overall clarity of a coated clear film.

One way to do this is to apply a liquid coating such as by a procedure illustrated in FIG. 5. The liquid need not contain any material known to function as a slip agent. The liquid could be in the form of a solution, either aqueous or in an organic solvent, a suspension, an emulsion, or a dispersion. The coating can be a polyamide, polyurethane, polyethyleneamine, nitrocellulose lacquer, shellac, nitrocellulose-modified polyamide, nitrocellulose-modified polyurethane, nitrocellulose-modified polyethyleneamine, or nitrocellulose-modified shellac. Preferred materials are nitrocellulose lacquers and nitrocellulose modified polyamide over-lacquers or overprint varnish. The liquid can be applied by well known surface printing methods, such as direct and offset gravure, flexography, or with a doctor blade, Meyer rod or air knife. It may be necessary to prime and/or treat the surface to obtain adequate adhesion of the solidified liquid to the shrink film surface. The primers may be polyamides, polyurethanes, polyethyleneamines or a natural resin (shellac). The treatment may consist of exposing either or both sides of the film to an energy source, such as a flame, corona discharge, plasma, or an x-ray or electron bombardment.

The liquid is solidified by removing the solvent, usually by drying with heat. The residual material may undergo curing before, during or after the solvent removal is complete, depending upon its chemical nature. The curing could be oxidative in nature, such as is well known, for example, with alkyd resins. It is desirable to solidify the liquid under as low a temperature and as short a time as possible so as not to alter the shrink properties of the film or lamination. It is preferable to maintain a film temperature below the melting point of the film, typically below 165° C. for oriented polypropylene-based films. However, the temperature must be sufficient so that the liquid coating can solidify by drying and/or curing at a rate rapidly enough for the process to be performed economically. More preferably, the web temperature is within the range of about 100° F. to about 200° F. and the time is within the range of about 0.1 seconds to about 2 hours.

It is preferred that the solidified coating be of the temperature resistant, i.e., to temperatures up to about 150° C., so that the favorable COF properties it imparts are maintained at elevated temperatures which might be experienced during shrinking the film or lamination or processing a labeled article through a filling line.

The liquid coating could also be of the solventless type which is caused to solidify by exposure to radiation, such as ultraviolet, electron beam, x-rays or gamma rays. These methods are advantageous in that this type of curing requires no equipment to handle solvent vapors. In addition, the shrink film or lamination need not be exposed to high temperatures to bring about the solidification. However, the liquid compositions amenable to curing by radiation are usually more costly.

Another way to achieve a shrink film or lamination with a low film-to-film coefficient of friction surface is to directly treat the film surface. This can be done by exposing the film or lamination to a plasma formed from a compound which modifies the film surface.

Plasma treatment can be carried out in any suitable plasma chamber, such as in a continuous roll-to-roll treater or in a batch, bell jar treater. A plasma is a gas containing charged and neutral species, including some or all of the flowing: electrons, positive ions, negative ions, atoms, and molecules. On average a plasma is electrically neutral, because any charge imbalance would result in electric fields that would tend to move the charges in such a way as to eliminate the imbalance.

The desired pressure in the plasma chamber ranges from about 0.2 to about 1.0 torr. An ac plasma excitation frequency in the range of about 100 kHz to about 2.45 GHz is preferred with an ac frequency of about 27 MHz being more preferred. A power density in the range of about 10 to about 1000 mW/cm$^2$ is preferred. A treatment time of about 5 seconds to about 10 minutes is preferred, with a time from about 1 minute to about 5 minutes being more preferred.

The plasma can contain any aliphatic hydrocarbon containing up to 12 carbon atoms and preferably 2 to 5 carbon atoms or a mixture of an inert gas with these hydrocarbons. Particularly preferred are the unsaturated hydrocarbons such as the alkenes and alkynes such as ethylene, propylene, butene-1, pentene-1, acetylene or methyl acetylene. The most preferred plasma treatment is with acetylene.

Example I-5 shows how such a plasma treatment can reduce the COF of a shrink film. This process is advantageous in that it occurs without excessively heating the film and therefore preserves the beneficial shrinkage properties of the film or laminate.

Although not wishing to be bound by any particular theory, after these treatments, it is thought that a hard crosslinked or glassy layer is formed on the treated shrink film surface.

The shrink film could be exposed to an oxygen and organosilane and/or organosiloxane plasma, for example, from oxygen and tetramethylsilane, tetramethyldisiloxane, or hexamethyldisiloxane. Although not wishing to be bound by any particular theory, after this treatment, it is thought that a hard silicon oxide surface layer is formed on the shrink film or lamination surface.

If an electron beam source is used to heat a target material in a vacuum, usually SiO or SiO$_2$, the target vaporizes and is caused to deposit on the surface of a shrink film or lamination backed by a chilled roller in a vacuum vapor deposition process akin to the well known vacuum metalization method for films. SiO is preferred over SiO$_2$ because of the much lower boiling point of the former. The vacuum level preferred is in the range of about 5×10$^{-6}$ to about 5×10$^{-4}$ torr. The power of the electron beam is, preferably, about 10 kW. This type of treatment could also lead to a hard silicon oxide surface layer being formed on the shrink film or lamination surface without excessive heating.

Although not wishing to be bound by any particular theory, a hard surface layer is thought to lower the static and/or kinetic coefficient of friction of a hard coated film sliding against itself, or metal, or any other surface in the following way. Without the coating, the shrink film is relatively soft, even though it has been oriented, and can deform and/or be indented by a sliding load. This increases the energy required to start or to move a load across the film surface and therefore leads to high frictional force. When the shrink film is coated with a hard or rigid coating layer, this surface resists deformation. Thus less energy would be required to start or to move a load across the coated surface, giving rise to a lower and more uniform frictional force. This translates directly to a lower coefficient of friction for the hard coated surface produced by any number of methods, including those described above and others which will be obvious to those skilled in the art.

EXAMPLE I-5

A flat sheet of shrink film is attached to the bottom electrode of a pair of 20 cm diameter metal electrodes spaced 1.2 cm apart. The side facing the top electrode is exposed to the plasma. The clear, 25 cm inner diameter glass bell jar top is put in place, sealed, and the 10 liter electrode chamber pumped down to a pressure of less than 0.1 torr, as read from a suitable pressure gauge, with a ½ hp vacuum pump. Acetylene is then admitted from a compressed gas cylinder through a pressure regulator into the chamber until a pressure of 0.2 torr is reached. The plasma is generated by applying the output of a radio frequency (27 MHz) generator to the electrodes with a power density of 64 mW/cm$^2$. After the 5 minute treatment time has elapsed, the generator power is turned off, air admitted to the chamber, and the treated shrink film removed.

Upon removal, the treated side has film-to-film kinetic COF of 0.25 and film-to-stainless steel kinetic COF of 0.26. The film has MD shrinkage of 19% and TD shrinkage of 7% at 140° C.

Plasma Treatment of Shrink Films or Laminates

In accordance with the present invention the COF of a polymer film may be reduced by plasma modification of a polymer film by exposing the film to a suitable plasma.

For this embodiment, it is preferable to expose a shrink film to plasma comprising of silicon-containing compound or a fluorine-containing compound. A plasma comprising a mixture of either or both of the above with an inert gas, such as argon, or a mixture of both of the above could also be used. The silicon or fluorine-containing compound is preferably a gas or a volatile liquid with a normal boiling point below about 110° C.

The silicon-containing compound forming the plasma is preferably an organosilane or organosiloxane or a mixture of these with or without an inert gas. More preferably, the silicon-containing compound forming the plasma is tetramethylsilane, tetramethyldisiloxane, trimethoxyvinylsilane, hexamethylcyclotrisiloxane, hexamethyldisiloxane and mixtures of tetramethylsilane, tetramethyldisiloxane, trimethoxyvinylsilane, hexamethylcyclotrisiloxane or hexamethyldisiloxane. Most preferably, the silicon-containing compound is hexamethyldisiloxane.

The fluorine-containing compound forming the plasma is preferably tetrafluoromethane, trifluoromethane, hexafluoroethane and mixtures of tetrafluoromethane, trifluoromethane, or hexafluoroethane with themselves or with themselves and an inert gas. More preferably, the fluorine-containing compound is hexafluoroethane.

The desired pressure in the plasma chamber ranges from about 0.2 to about 1.0 torr. An ac plasma excitation frequency in the range of about 100 kHz to about 2.45 GHz is preferred with an ac frequency of about 27 MHz being more preferred. A power density in the range of about 10 to about 1000 mW/cm$^2$ is preferred. A treatment time of about 5 seconds to about 10 minutes is preferred, with a time from about 1 minute to about 5 minutes more preferred. Example I-6 demonstrates how the coefficient of friction of a shrink film can be lowered by exposure to a hexafluoroethane plasma.

Although not wishing to be bound by any particular theory, the decreased film-to-film kinetic coefficient of friction of the shrink film or laminate after exposure to the plasma described above is thought to be attributed to the deposition of a very thin layer on the surface. It is well known in the art that the coefficient of friction for the fluorinated polymer polytetrafluoroethylene, or the silicon containing polymer polydimethylsiloxane, is low. Perhaps the plasma treatment deposits a material like either of these two polymers on the polyolefin surface, making the shrink film or laminate surface more like one of these to polymers with their favorable low coefficient of friction characteristic.

The plasma treatment process is advantageous in that it occurs without excessively heating the film and therefore preserves the beneficial shrinkage properties of the film or laminate.

EXAMPLE I-6

A flat sheet of shrink film is attached to the bottom electrode of a pair of 20 cm diameter metal electrodes spaced 1.2 cm apart. The side facing the top electrode is exposed to the plasma. The clear, 25 cm inner diameter glass bell jar top is put in place, sealed, and the 10 liter electrode chamber pumped down to a pressure of less than 0.1 torr, as read from a suitable pressure gauge, with a ½ vacuum pump. Hexafluoroethane is then admitted from a compressed gas cylinder through a pressure regulator into the chamber until a pressure of 1.0 torr is reached. The plasma is generated by applying the output of a radio frequency (27 MHz) generator to the electrodes with a power density of 286 mW/cm$^2$. After the 5 minutes of treatment time has elapsed, the generator power is turned off, air admitted to the chamber, and the treated shrink film removed.

Upon removal, the treated side has film-to-film kinetic COF of 0.32 and film-to-stainless steel kinetic COF of 0.32. The film has MD shrinkage of 18% and TD shrinkage of 8% at 140° C.

The present invention is preferably directed to altering the coefficient of friction (COF) and altering the machine direction (MD) and the transverse of cross direction (TD) shrinkages of biaxially oriented polypropylene (BOPP) films. In so doing, preferably BOPP films are drawn or tensiled to produce a new film with more pronounced MD shrinkage properties and a reduced COF of the film surface, as described above. The COF of the shrink film surface is lowered in one of several ways, as discussed in detail above. The favorable shrinkage properties, i.e. MD and TD shrinkages, are imparted to the film in the same way as described in more detail in this patent application hereinbelow.

In practical uses, containers are envisioned to be labeled with a film or lamination of one shrink film to another film. The graphics and printing are trapped between the films for protection from scuffing and damage but are visible through the outer clear film layer. Several examples cited in Table I are for this type of laminated structure. The overall lamination has shrink properties suitable for labeling containers while the outer clear layer has low COF on the outside surface.

Procedures for High Speed Filling and Packaging

In general, the advantages of using a shrinkable film for labeling containers have been enumerated in the previously cited patent application, however, these advantages cannot be realized economically unless the film labeled containers can be processed through high speed (100–2500 containers/min.) commercial filling and packaging machinery. A low COF on the label surface is required for these high speeds to be reached. As a point of reference, typical litho-printed or dry offset printed aluminum beverage cans have surface/surface kinetic COF of equal to or less than 0.22.

The following is a description of a typical container filling line for which containers labeled with a shrink film or lamination having a COF and shrink properties in accordance with the present invention are particularly suitable. Empty containers are depalletized and converge into a single lane. They are inverted via a twist section and the inside is spray washed. The washed containers are reinverted by a second twist station and enter a filler where they are filled with product. Filling speeds range from 100 to 2500 containers/minute. Filled containers are capped and sealed. They may then enter either a warmer or a pasteurizer. In either of these operations the containers usually number about 20 to about 60 across in width. The containers are then conveyed into a single film via guide rails. They are twisted and spray washed and can undergo a weight check or x-ray inspection. The finished product is conveyed to an accumulating area then converges for secondary packaging operations, typically into cases. The finished cases are then palletized for shipment.

Procedure for Measuring Coefficient of Friction

The following procedure is used to measure the sliding coefficient of friction (COF) of film over stainless steel or film surfaces at room temperature, thereby simulating the conditions which the film may encounter on filling and packaging equipment. The test specimen is secured to the sliding surface of a sled of known weight which is attached to a force transducer by a length of wire. The transducer or load cell electrically reacts to the tension produced in the wire as the platform and the sled which rests on it move with respect to one another.

An Instrumentors Slip/Peel Tester, Model SP-101A (Imass Inc.) with a moving platen, to which a type 304 stainless steel plate is attached, is used to conduct the test.

The stainless steel plate surface is cleaned with acetone before each run. It should be free of any dirt, smudges, fingerprints, or surface scratches.

TABLE I

EXAMPLES OF LOW COF SHRINK LABEL FILMS AND/OR LAMINATES

| Example # | CONTROL FILM(S) | | | | IMPROVED FILM AND/OR LAMINATION | | | |
|---|---|---|---|---|---|---|---|---|
| | Kinetic COF | | % Shrinkage | | Kinetic COF | | % Shrinkage | |
| | Film/Film | Film/SS | 140° C. MD | 140° C. TD | Film/Film | Film/SS | 140° C. MD | 140° C. TD |
| I-1A | 0.39 | 0.31 | 21.5 | 24 | 0.28 | 0.24 | 20 | 12 |
| I-1B | 0.39 | 0.31 | 21.5 | 24 | 0.29 | 0.23 | 25 | -1.5 |
| I-2A | 0.49 | 0.23 | 17.5 | 35 | 0.15 | 0.13 | 22 | 7 |
| I-2B | 0.49 | 0.23 | 17.5 | 35 | 0.28 | 0.17 | 24 | 1 |
| I-3 | 0.31 | 0.19 | 5 | 1 | 0.31 | 0.23 | 18.5 | -9 |
| I-4A | 0.61 | 0.20 | 14 | 19 | 0.23 | 0.16 | 20 | 10 |
| I-4B | 0.52 | 0.27 | 13 | 19 | 0.16 | 0.24 | 19 | 9 |
| I-5 | 0.49 | 0.36 | 19 | 7 | 0.25 | 0.26 | 19 | 7 |
| I-6 | 0.49 | 0.36 | 19 | 7 | 0.32 | 0.32 | 18 | 8 |

The test film or lamination is selected to be clean and relatively free of wrinkles, creases, dirt, smudges, or fingerprints.

A 2⅜"×2⅝" metal sled with medium density foam rubber bonded to the underside is used. The nominal sled weight is 200 plus/minus 5 grams. A screw eye is included and attached in the center of the sled.

A 2½" wide (TD)×5" long (MD) sample is cut for the sled. Static is removed from the film side to be tested by making 4 passes over a static bar (SIMCO MEB shockless static bar) with the film within ¾" of the bar. The opposite side of the film is adhered to the sled with double faced adhesive tape. The specimen covered sled is attached with a length of nichrome wire through its eye screw to the transducer. The specimen wrapped sled is placed onto the test plate so that there is minimal tension on the transducer.

"Peak" is selected for the display readout and the motor started. The initial maximum reading displayed is recorded as the static coefficient of friction for film-to-stainless steel.

"Average" is selected for the display readout when the integrator pilot light comes on. Immediately after a 20 second time period has elapsed (pilot light turns off), the motor is stopped and the average reading displayed is recorded as the kinetic coefficient of friction for film-to-stainless steel.

The procedure is repeated with a new set of specimens for minimum of three replicates per film sample and an average static and kinetic COF calculated and recorded.

For testing film-to-film static and kinetic COF, the same procedure is followed except that a 3" wide (TD)×6" long (MD) sample is cut for the platen. Double faced tape is applied to the movable platen. Static is removed from the film side to be tested as above and the non-test side secured to the tape on the platen. Testing then continues as above with preparation of the sled sample.

Note that this procedure is based on ASTM D1894-87 "Coefficients of Friction of Plastic Film."

The present invention, as described above, has been found to be most preferred when applied to or otherwise used in conjunction with a shrink film which has been treated in a manner which involves subjecting a film to temperature, and machine draw parameters and film parameters that allow for control of resultant shrinkage of a polymer film, i.e., by achieving a balance of temperature, draw ratio, line speed, and oriented polymer film properties to produce enhanced machine direction (MD) shrinkage with a very low degree of transverse direction (TD) shrinkage. This balancing of MD and TD shrinkage, particularly in oriented polypropylene (OPP) films, imparts unique shrink label and packaging characteristics which are particularly advantageous when such a film is subjected to a treatment in accordance with the present invention, as described above, to lower the coefficient of friction of the film.

The MD reorientation in accordance with the present invention involves placing a conventional OPP polymer film on a series of heated rolls or in an oven and, by keeping the temperature of the heated rolls or oven below the melting temperature of the film, the stress necessary to orient the film is reduced. For example, polypropylene begins to shrink near 100° C. and shrinkage continues to increase until melting at greater than about 160° C. The MD reorientation can take place after the OPP film is produced or, in some cases, the reorientation can take place in line while the OPP film is being produced. Most polymer products respond to this orientation with an enhanced high temperature shrinkage. The majority of the products' response is in the direction of the imposed strain.

The basic processes for producing polymer films to make the novel polymer shrink films which are treated so as to have a kinetic film-to-film coefficient of friction in accordance with the present invention may be selected from the group of conventional processes for producing BOPP polymer films, such as the tubular and tenter techniques.

In general, in the tubular or bubble process, molten polymer is extruded from an annular die and then quenched to form a tube. The wall thickness of the tube is controlled partly by the annular die gap and partly by the relative speeds of extrusion and haul-off. The tube passes through slow running nip rolls and is then re-heated to a uniform temperature. Transverse drawing is achieved by increasing the air pressure in the tube, the draw ratio, and/or by adjustments to the volume of entrapped air. The air is trapped by pinch rolls at the end of the bubble remote from the extruder and these are generally run at a faster speed than the first pair, thus causing drawing of the film in the machine direction. The tubular process thus obtains simultaneous transverse and forward orientation.

In the second of the previously mentioned processes, i.e., the tenter process, the polymer is extruded through a slot die and quenched. The extruded sheet is normally oriented in two sequential steps. The first step is usually longitudinal orientation between rolls running at different speeds. In the second stage, the film enters a tenter frame, where it is stretched laterally by means of diverging chains of clips. Whereas the bubble process operates at constant pressure, the tenter frame process operates at a constant rate of elongation. Somewhat higher stretching forces are required in the second stage which may be carried out at slightly higher temperatures. This is mainly due to crystallization of the film during the first stretching operation. The tenter frame process can also be carried out as a simultaneous operation in which an extruded sheet with beaded edges is biaxially oriented in a tenter frame equipped with diverging roller grips for holding and stretching the film.

The tenter or tenter frame operation has the advantage of considerable versatility, producing films with a wide range of shrink properties.

After stretching, polymer orientation is locked into the film by cooling. When the oriented film is subsequently heated up to temperatures in the vicinity of the stretching temperature, the frozen-in stresses become effective and the film shrinks. Strains and stresses which are related to the degree of orientation and the forces which are applied during stretching are thereby recovered.

The polyolefin shrink films of this invention can also exhibit a variety of surface behavior or characteristics common to typical OPP packaging films as is known to the art.

The character of a polymer surface can be changed in several ways. One method is to expose the surface to an energy source, such as a corona discharge, plasma, or an x-ray or electron bombardment. This can be done over a broad temperature range in an inert atmosphere or reactive atmosphere. Depending on the temperature, intensity, rate of application, and frequency of the energy and the nature and concentration of the chemical medium in contact with the surface before, during, and/or after energy application, a wide range of physical and/or chemical modifications of the film surface can be effected.

A second way to change a polymer surface is to cause an internal chemical additive to bloom to the surface by the application or removal of heat from the film. Alternatively, a substance on the surface of the film can be made to migrate inside of the film and away from the surface by the application or removal of heat from the film. The chemical nature of the substance or additive and the time/temperature history to which it is exposed can lead to a wide range of possible surface modifications.

A third way to change a polymer surface is to cause a change in surface morphology by the application of heat and/or pressure to the film. The physical and topological nature of the surface can be altered, for example, by annealing a film and changing the crystalline structure present on the film surface.

The MD re-orientation of biaxially oriented polypropylene film (BOPP) is more complex than for conventional films due at lest in part to initial residual stresses placed on the film. For example, in accordance with the present invention, it has been discovered that at a 140° C. shrink temperature, BOPP films may shrink 15% in the machine direction (MD) or transverse direction (TD). After this same film is tensilized, 5–30% transverse direction reduction in film width results and 140° C. film shrinkage is biased in the MD direction, i.e. 140° C. MD shrinkage equals 25% and 140° C. TD shrinkage equals 5%.

This is in contrast to prior art procedures wherein polymer strapping, fibers and film can be drawn/tensilized to re-orient and structure to produce properties different from the original product.

For purposes of the present invention, the following procedure, derived from ASTM method D2732-83, which is designed to measure unrestrained linear shrinkage in both the machine and transverse directions, was used for measuring unrestrained linear thermal film shrinkage in a single direction at a time.

A polydimethylsiloxane fluid (0.5 cs) bath is first preheated to desired temperatures within the range of about 100° C. to 140° C.

Film samples are precut to 0.5"×22 cm and a 20 cm span is marked in the sample center. Ends are left on a sample so the sample can be anchored for immersion. One end of at least three films of each sample is placed in an immersion rack. A 1.2 g metal alligator clip is attached to the free long end of each film strip to keep the film from floating in the bath. The machine direction and the transverse direction are tested for each film. The heater/stirrer is then turned off and the samples on the rack are immersed into the proper temperature bath for a count of five seconds prior to being removed from the liquid. The samples are immediately measure and their % shrinkage calculated. For example, with a 20 cm sample span, a shrinkage of 1 mm equals 0.5% shrinkage. The average shrinkage of all the samples run in one direction (MD or TD) is then recorded for a particular film sample. If there is an elongation rather than a shrinkage, a negative value is reported.

Thermal shrink properties of the novel polymer shrink films of the present invention are characterized by shrinkage in the machine direction (MD) and transverse direction (TD) as a function of temperature.

These shrink characteristics are outlined as follows:

| Temperature °C. | Shrikage MD (%) | Shrinkage TD (%) |
| --- | --- | --- |
| 100 | 4 to 15 | −6 to 5 |
| 110 | 6 to 25 | −8 to 7 |
| 120 | 10 to 30 | −10 to 10 |
| 130 | 12 to 40 | −12 to 15 |
| 140 | 20 to 40 | −15 to 15 |
| 150 | 20 to 40 | −20 to 15. |

The unique thermal shrink properties, combined with the orientation/tensile properties of the novel polymer shrink films of the present invention allow for the useful practice of using conventional labeling equipment of the novel films of the present invention.

The tensile properties are characterized as follows:

| UNIQUE TENSILE PROPERTIES OF THIS INVENTION | | | |
| --- | --- | --- | --- |
| Property | Typical OPP | Uniax Shrink Film | BOPP Shrink Film |
| Modulus, psi MD | 80,000–350,000 | 50,000 | 350,000–850,000 |
| TD | 350,000–390,000 | 160,000 | 100,000–500,000 |
| Tensile MD | 22,000–30,000 | 30,000 | 30,000–50,000 |
| Strength, psi TD | 30,000–43,000 | 5,000 | 15,000–35,000 |
| Ultimate MD | 70–165 | 130 | 20–120 |
| Elongation, % TD | 30–50 | 1100 | 50–250. |

The tensile strength, elongation and modulus were measured using the ASTM D882 test procedure.

The processes of the present invention, as described herein for producing shrink film and resultant shrink film layers and laminates are polymer-based polyolefin films such as polypropylene. In this regard, the polypropylene character of the film is preferably a homopolymer, although copolymers of propylene with minor amounts of ethylene or an alphaolefin and the respective blends can also be used. Typical commercially available film-forming propylene homopolymers are crystalline or isotactic in their molecular structure and normally have a melt flow rate of about 2 to 10 dg/min. Conventionally, the polypropylene is compounded with conventional additives such as anti-oxidants, light stabilizers, inorganic antacids, such as calcium oxide or magnesium aluminum hydroxide carbonate hydrate in addition to fatty acid amide slip agents.

In accordance with the present invention, the novel polymer shrink films of the present invention can be used as a single web or formed into a laminate, with use as a laminate being particularly beneficial.

For purposes of the present invention, any conventional lamination process may be used inasmuch as the novel polymer shrink film of the present invention has been observed to be capable of being suitably laminated using known technology, e.g., selected from the group consisting of wet bonding, dry bonding, hot melt or wax laminating, extrusion lamination, and thermal or heat laminating; however, dry bonding and thermal or heat laminating are preferred.

Dry bonding involves applying adhesive to one of the films or webs. The solvent is evaporated from the adhesive and the adhesive-coated web is combined with the other web material by heat and pressure or by pressure only.

Thermal laminating brings together coated substrates under heat and pressure. Typically, the webs are heated to the softening point of the coating; however, improved results, e.g., in clarity, are obtained when using preheat rolls and a steam box.

Related to this, labels are normally printed and the printing is expected to be permanent. If the exposed printed surface is abraded, then the printing can be removed or scuffed. If, however, the printing is on the inside surface of a clear film and this clear film is laminated to another film, the printing is protected by the clear film. Alternatively, the printing can be on the inside surface or the clear or opaque web laminated to the clear protective overweb. In addition, the outermost surface of the laminate can be made matte, glossy, of low coefficient of friction, different in surface tension or composition, independent from the nature of the surface required to accept inks. Also, the adhesion of the printed film to a container can be influenced by the presence of ink. For example, a typical failure of a film-to-container bond will occur by separation at the weakest point or at the ink from the film, with no failure of the adhesive. By placing the ink between the layers of a laminated film this weak point is removed, allowing for the adhesive to bond directly form laminate surface to the container. Printing can also be applied to a clear film layer and either a clear or opaque film, or a metallized version of either type of film, can be laminated to the printed web.

For purposes of the present invention, the novel polymer shrink films may be printed using conventional printing techniques including flexographic printing and rotogravure printing.

Flexographic printing procedures typically employ presses selected from the group consisting of stack, central-impression, and in-line presses; flexographic printing which employs a central impression or common impression plate is preferred.

Plate preparation for flexography involves taking the art work through standard engraving procedures to form a zinc plate. At this point, a phenolic resin negative of the zinc plate is made from which the rubber positive of the zinc plate can be formed by standard molding methods using 0.0125-inch-thick rubber sheeting formulated for platemaking. Alternately, photosensitive glass and plastics may be used instead of the zinc plates.

A typical method of mounting the plate employs a pressure sensitive material to adhere the rubber plate to the plate cylinder; vulcanizing the rubber plate to a metal brace that can be clamped around the plate cylinder may also be used for this purpose.

A conventional flexographic press consists of four sections: An unwind station for the web to be printed, a printing section, a drying oven, and a windup for the finished printed web.

The unwind section provides for the mounting of two additional rolls and a flying splice mechanism that allows for automatic splicing of the new roll to the expiring roll going through the press. Similarly, the windup section is provided with multiple windup spindles, usually two, and a mechanism for cutting the web when the roll on one spindle has reached a desired size and for attaching the free end to a core mounted on the second spindle for continuous output.

Web tension has a definite effect on print register and on slit roll quality, and particularly on central-impression flexographic presses, the web should be pulled tight around the central drum to eliminate wrinkles or flatness deficiencies.

Drying is performed with high-velocity hot air generated by gas burners, distribution ducts, and between-color dryers. The latter are a major aid in trapping the ink laid down in one color station before the next color is printed. This prevents the new color from causing the previous color to smear.

Drying temperature should be as high as possible to ensure best solvent removal; however, drying temperature should not be high as to cause film shrinkage. A suitable manner for determining proper temperature is to increase heat until film shrink begins, i.e., 2 to 5%, and then back off 5° F. For purposes of the present invention, web temperature is preferably approximately 170° F.; although the printing process may run at a slightly higher drying temperature.

The rotogravure process uses a metal cylinder printing member into which the design to be printed has been etched. Rotogravure equipment resembles an in-line flexographic press in that it, too, requires an unwind, a printing section, a dryer, and a rewind. However, each color station has a dryer designed to dry one color completely.

A typical rotogravure color unit includes an impression roll, a printing (engraved) cylinder or roll, an ink supply, e.g., an ink pen or fountain, and a doctor blade. The printing cylinder rotates in the ink fountain, picking up excess ink. The doctor blade, which oscillates parallel to the axis of the printing cylinder to prevent accumulation of dirt behind the blade that can cause streaks, removes the excess, permitting ink to remain only in the cells of the engraved part of the roll, since the bottom of the cells are below the surface of the cylinder. The impression cylinder, which is rubber covered, squeezes the web to be printed against the engraved roll, causing the web to remove ink from the engraving as it leaves the nip, thus accomplishing transfer of ink from the printing cylinder to the moving web. In flexography, the printing is done by a molded rubber plate using a metal impression roll. In rotogravure, the printing plate is an engraved metal roll and the impression roll is rubber covered.

A typical rotogravure press arrangement also includes two color stations, although eight color presses that can print several-tone cylinders and line cylinders, e.g., for type and can apply an overall high-gloss lacquer in-line are also typical. Rotogravure presses may also have flying splice unwinds with precise tension controls.

The process of using the novel polymer shrink films of the present invention to produce laminates which are applied to an article in accordance with the present invention has been discovered to overcome the previously mentioned disadvantages. In this regard, the present invention allows for a single printing operation to produce as many as four laminate variations. Also, shrinkable webs with different shrinkage properties can be laminated to a common printed shrinkable web to give laminates with different shrinkage properties tailored to the particular container or the requirements of the application. In addition, shrinkable webs of different shrinkage properties can also be laminated together to give a laminate whose shrinkage properties might be difficult to achieve using only a single film.

Related to the embodiment of the present invention which employs laminates, the heat shrinkable laminations may be composed of two or more polymer shrink films or heat shrinkable webs. Each polymer shrink film or web may function on its own as a heat shrinkable label or each web may be clear or opaque, metallized or non metallized, have similar or dissimilar surface character and shrinkage properties. In these embodiments, each web is preferably composed of polypropylene, a polypropylene copolymer or a blend of polypropylene, and a polypropylene copolymer. Each web is preferably biaxially oriented, providing high strength in all directions of the film plane, unlike uniaxially oriented films which are strong in the orientation direction but weak in the perpendicular direction.

The process according to the present invention may be further appreciated by reference to the following examples which are, of course, only representative of the present invention and in no way are meant to limit the present invention in any way to the particulars which are disclosed. Thus, the following are given merely as non-limiting examples to further explain the present invention.

EXAMPLE II-1

Sequential Blown Film Process for Manufacturing Shrink Label Film

The manufacturing apparatus used in the sequential blown film process as shown in FIG. 1 consists of an extruder system 1, a tubular die 2, a water bath quench system 3, a nip roll assembly 4, reheating oven 5, a single stage bubble blowing section 6 (where MD and TD draw occur), a convergence section 7 including convergence rolls (7a, 7b and 7c), and draw rolls 8, a heating oven 9 for altering shrinkage properties, draw rolls 10 and a mill roll winder 11.

The extrusion system 1 consists of an extruder with output capabilities of 400 lb/hr. The terminal end of the extruder has an annular die 2 which forms the melted polymer into a hollow polymer tube (six inches in diameter).

After the polymer tube has been extruded, it is quenched in a temperature controlled water bath 3. The tube continues through a nip 4 and into ovens 5 where the polymer tube is reheated. At this point, the tube is blown into a thin walled bubble 6. The controlled internal pressure in the polymer tube causes the hot tube to expand, drawing the film in the TD direction. A fast nip (with speed S1) draw rolls 8, located after a multi-roll 7 v-shaped convergence section 7, causes the bubble to be drawn in the MD simultaneous with TD draw. The drawn film of width (W1) passes through a heating oven 9. The width is allowed to contract at the end of the oven (to W2), resulting in altered TD shrink properties. The film is pulled through the heating oven by a nip of draw rolls 10 located at the end of the oven. The speed at which the nip pulls the film through the oven is represented by S2. By controlling speeds S1 and S2, the MD shrinkage properties are altered. S2 speed can be greater than, equal to, or less than S1 depending upon the final shrink properties desired. The film is then wound onto a roll using a mill roll winder 11.

Table II-A illustrates that the 140° C. MD/TD shrinkage ratio is between 25%/8% and 23%/5%. Example II-1 demonstrates that film with desirable shrinkage properties can be produced using a sequential blown film process.

roll 26, a water bath (not shown), and a dewatering air knife (not shown). The melt is laid on a chill roll (not shown), which brings one side of the casting into contact with a cold mirror chrome surface. Seconds later, the other side of the casting is introduced to the water bath. The casting drum or roll 26 is oil heated and cooled, allowing for rapid temperature change.

The forward draw unit 27 of the MD draw section 22 allows the film to travel around a dancer roll (not shown), six preheated rolls (not shown), around six draw rolls (not shown), four anneal (fast) rolls (not shown), and an exit dancer roll (not shown). By using circulating oil, all of the rolls are capable of heating and cooling.

The tenter oven 23 consists of six sections (not shown). Each section has a separate temperature control (not shown) and a fan (not shown) for air flow control. The oven has electrically heated air with a variable temperature range of 50° C. to 250° C. in any section. The maximum draw for any single section using a standard uniax width is seven times. By using two orientation sections, the tenter is capable of a ten times maximum draw. The oven is equipped with clip cooling, that enables draw at temperatures of over 200° C.

The tensilizer is an in-line post MD draw unit 24, which takes film directly from the tenter oven. The tensilizer consists of nine mirror chrome preheat rolls (not shown), one or two stage draw (not shown), and four chrome fast (anneal) rolls (not shown). The unit uses 180° wraps on the nine preheat rolls (not shown) to reduce slippage. The rolls are mounted alternately on two separate frames. The preheat rolls temperature is controlled in adjoining pairs. Infrared heating is an option at the point of draw.

Film is manufactured from the tandem configuration of a machine direction orientation (MDO)/transverse direction orientation (TDO)/secondary stage machine direction orien-

TABLE II-A

CLEAR SHRINKAGE FILMS PRODCUED BY A SEQUENTIAL BLOWN FILM PROCESS

| | Roll Speeds | | | Film | | | Shrinkage, % | | | | |
|---|---|---|---|---|---|---|---|---|---|---|---|
| | (ft/min) | | | Width (cm) | | Oven | 140° C. | | 120° C. | | |
| Designation | S1 | S2 | RS | W1 | W2 | Temp (°F.) | MD | TD | MD | TD | Comments |
| A1 | 220 | 217 | 0.99 | 167 | 116 | 352 | 23 | 5 | — | — | |
| A2 | 220 | 210 | 0.95 | 167 | 120.5 | 335 | 22 | 10 | — | — | |
| Control | 220 | 198 | 0.90 | 167 | 153 | 280 | 22 | 26 | — | — | control |

Conditions:
Nominal Final Gauge: 96
RS = S1/S2

EXAMPLE II-2

Sequential Tenter Film Process for Manufacturing Shrink Label Film

Figure 2:
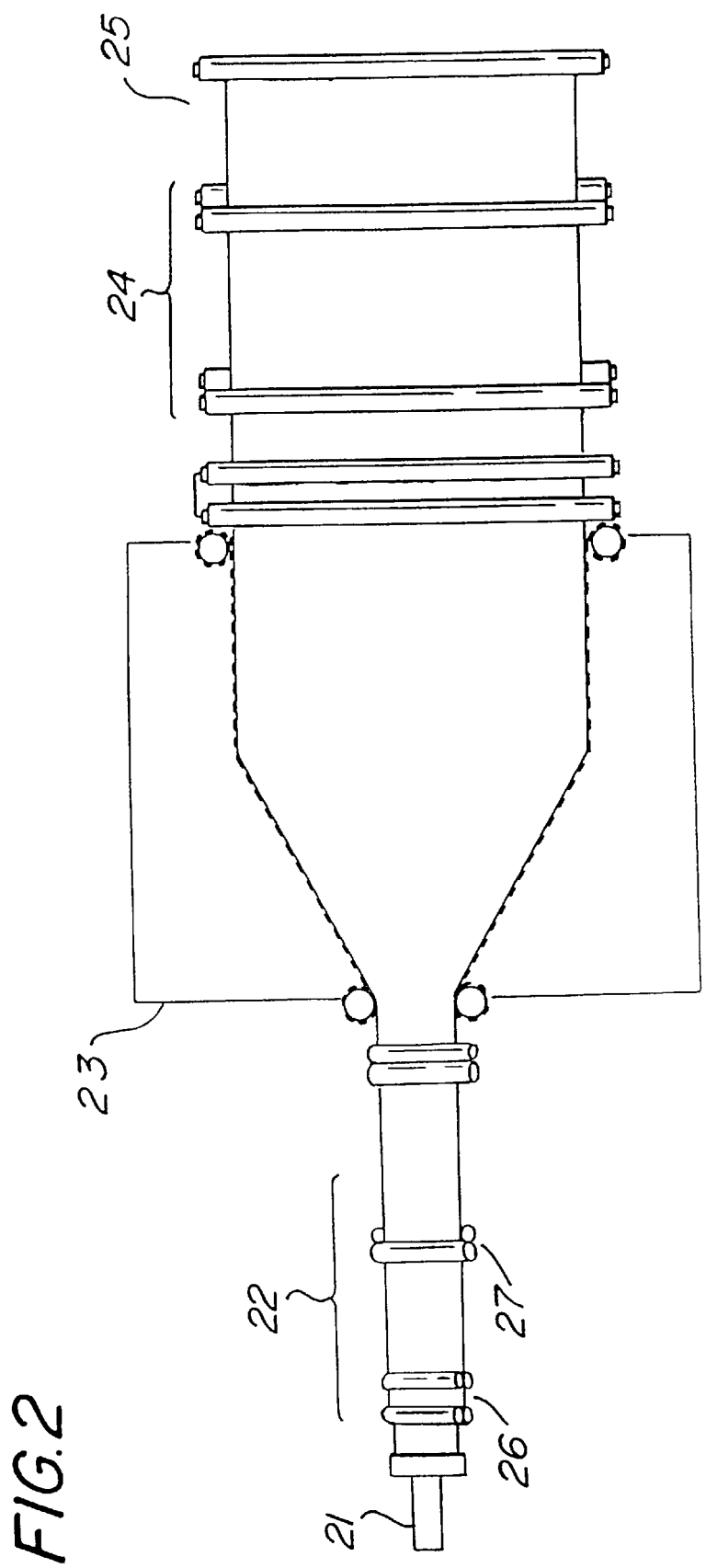
FIG. 2 is a schematic illustration showing a sequential tenter film process for making shrink film.

The manufacturing apparatus used for purposes of the present invention is illustrated schematically in FIG. 2. It is composed of four extruders in an extruder and die section 21; a one/two stage MD draw section 22, a tenter oven 23, a post MD stretch unit 24 and a mill roll winder 25.

The extrusion system 21 is composed of one main extruder (60 kg/hr maximum output) and three satellite extruders (two with 12 kg/hr maximum output and one with a 6 kg/hr maximum output), not shown.

The casting unit of the one/two stage MD draw section 22 is composed of an air knife (not shown), a chrome casting tation unit. This OPP film is 128 gauge and 44.6 inches wide. The input shrinkages to the second stage MDO are 10% the machine direction and 6% in the transverse direction. The tentered film is fed directly into the second stage machine direction orientation. Orientation was at 120° C. with machine draw ratios (RS) between 1.40 to 1.70.

Table II-B illustrates the 140° C. MD/TD shrinkage to be between 29%/0% and 33%/2%. This example demonstrates that film with desirable shrinkage properties can be produced by sequential tenter process.

TABLE II-B

SHRINKAGE FILMS PRODUCED BY A SEQUENTIAL TENTER FILM PROCESS

| Designation | IR Heating % | Draw (RS) | Shrinkage, % Draw (RD) | 140° C. (MD) | 140° C. (TD) |
|---|---|---|---|---|---|
| B1 | 60 | 1.70 | 1.37 | 33 | 2 |
| B2 | 50 | 1.60 | 1.30 | 34 | 1 |
| B3 | 40 | 1.50 | 1.21 | 29 | 0 |
| B4 | 0 | 1.50 | 1.26 | 29 | 1 |
| Control | 0 | 1.00 | 1.00 | 10 | 6 |

Terms:
IR = infrared
RS = run speed ratio (see definition of terms)
RD = film draw ratio (see definition of terms)
MD = machine direction
TD = transverse direction
Conditions:
Preheat temperature - 120° C.
Nominal film width - 41 inches
Tensilized nominal gauge - 110
Nominal MD shrinkage at 100° C. = 10.5%

EXAMPLE II-3

Out of Line Process for Manufacturing Shrink Label Film

Figure 3:
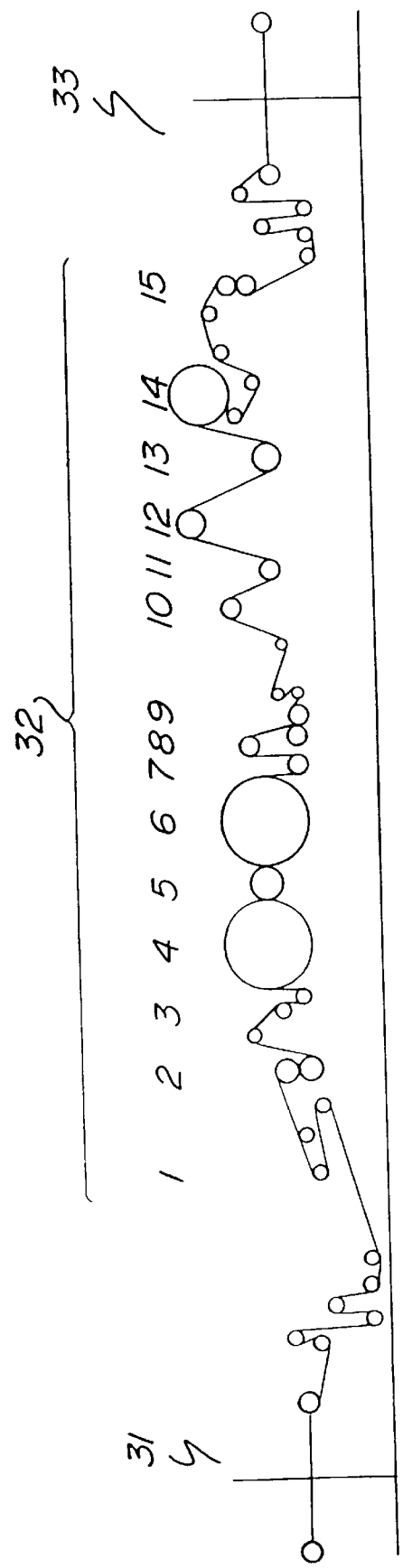
FIG. 3 is a schematic illustration showing an out-of-line process for making shrink film.

The manufacturing apparatus shown in FIG. 3 consists of an unwind stand 31, 15 driven film rolls 32 (each with a variable speed and heating control), including a driven chill roll, and a winding stand 33. Biaxially oriented film to be converted into shrinkable film is loaded into the unwind stand 31. This film can be produced by any process; however, biaxially oriented films made by a tentering or a bubble process are generally used. The film can be clear or opaque and single layer or multilayer. The film is usually in the thickness range of 50 to 200 gauge, most preferably 60 to 140 nominal gauge.

After unwinding, the film passes from a feed section (three powered rollers—i.e., nos. 1–3) into a preheat section. This section of three powered rollers, i.e., nos. 4–6 contains two large diameter preheated rolls with a 180 wrap of film, to raise the incoming film to proper operating temperature. The film is then passed through a draw zone of five powered rolls, i.e., nos. 7–11, followed by a corona treatment zone with two powered, ceramic rolls, i.e., nos 12 and 13, then over large diameter chill roll no. 14 which reduces film temperature before windup, and finally, through an output nip (no. 15) before windup.

Powered roll speeds are increased from unwind to windup enabling the film to be drawn or tensilized in the machine or longitudinal direction. Roll speed of roll no. 1 at the entrance to the feed zone is nominally 800 feet/minute. Roll speed at the chill roll no. 14 varies from 1000 to 1500, depending on the amount of draw desired to be imparted to the film. The mean operating temperature of the process is usually between 90° C. to 150° C. with the chill roll temperature ranging from 60° F. to 90° F.

Clear films with moderate 140° C. MD shrinkage (25%) and minimal 140° C. TD shrinkage (3%) have been produced by this process (see Table II-C). Table II-C illustrates a range of shrinkable films with higher MD shrinkage (up to 32%) with low TD shrinkage (5%).

TABLE II-C

CLEAR SHRINK FILMS PRODUCED BY AN OUT-OF-LINE ORIENTATION PROCESS OF BIAXIALLY ORIENTED OPP FILM

| Designation | Gauge | Draw RS | Draw RD | Process Temp, ° C. | Shrinkage, % 140° C. MD | 140° C. TD | 120° C. MD | 120° C. TD | 100° C. MD | 100° C. TD |
|---|---|---|---|---|---|---|---|---|---|---|
| C1 | 83 | 1.47 | 1.16 | 113 | 24 | 9 | 13 | −7 | 7 | −7 |
| C2 | 80 | 1.50 | 1.15 | 114 | 23 | 5 | 13 | −9 | 7 | −7 |
| Control | 77 | 1 | 1 | | 14 | 19 | 5 | 3 | 2 | −1 |
| C3 | 63 | 1.48 | 1.27 | 112 | 23 | 1 | 18 | −9 | — | — |
| Control | 65 | 1 | 1 | | 11 | 17 | 4 | 4 | — | — |
| C4 | 79 | 1.55 | 1.21 | 113 | 32 | 5 | 22 | −10 | — | — |
| Control | 74 | 1 | 1 | | 22 | 24 | 9 | 6 | — | — |
| C5 | 80 | 1.28 | 1.12 | 108 | 20 | 6 | 9 | −7 | 5 | −5 |
| Control | 77 | 1 | 1 | | 13 | 16 | 2 | −1 | — | — |

Opaque films, with moderate 140° C. MD shrinkage (20%) have been produced by this process (see Table II-D). Another example in the same table illustrates an opaque shrinkable film higher MD shrinkage (33%) and lower TD shrinkage (−19%).

TABLE II-D

OPAQUE SHRINK FILMS PRODUCED BY AN OUT-OF-LINE ORIENTATION PROCESS OF BIAXIALLY ORIENTED OPP

| Designation | Gauge | Draw RS | Draw RD | Process Temp, °C. | Shrinkage, % 140° C. MD | 140° C. TD | 120° C. MD | 120° C. TD | 100° C. MD | 100° C. TD |
|---|---|---|---|---|---|---|---|---|---|---|
| D1 | 129 | 1.54 | 1.25 | 113 | 24 | −10 | 16 | −12 | 10 | −7 |
| D2 | 130 | 1.55 | 1.21 | 113 | 25 | −11 | 17 | −12 | 11 | −9 |
| Control | 132 | 1 | 1 | — | 9 | 3 | 3 | −1 | 1 | −1 |
| D3 | 119 | 1.80 | 1.31 | 109 | 33 | −19 | 24 | −20 | 12 | −12 |
| Control | 124 | 1 | 1 | — | 9 | 4 | 4 | −1 | — | — |
| D4 | 137 | 1.56 | 1.18 | 113 | 20 | −7 | 14 | −8 | 8 | −6 |
| Control | 139 | 1 | 1 | — | 8 | 3 | 2 | −1 | — | — |
| D5 | 113 | 1.55 | | 112 | 27 | −9 | 19 | −13 | — | — |
| D6 | 128 | 1.55 | | 112 | 28 | −6 | 20 | −13 | — | — |

These thermal shrink properties are also in multilayer film laminates of clear/clear, clear/opaque, opaque/opaque or a metallized version of any combination. Table II-E lists several examples.

TABLE II-E

PROPERTIES OF SHRINK LABEL LAMINATIONS MADE FROM SHRINKABLE OPP FILMS

| DESIGNATION | FILM TYPE | Shrinkage % 140° C. MD | 140° C. TD | 120° C. MD | 120° C. TD |
|---|---|---|---|---|---|
| E1 | Opaque | 22 | −9 | 15 | −11 |
| | Clear | 22 | 6 | 13 | −7 |
| | Laminate Front Above | 19 | 0 | 12 | −7 |
| E2 | Clear | 22 | 6 | 13 | −7 |
| | Laminate From Above | 20 | 8 | 11 | −5 |
| E3 | Clear | 23 | 7 | 13 | −6 |
| | Opaque | 25 | −11 | 16 | −12 |
| | Laminate From Above | 21 | 1 | 14 | −8 |
| E4 | Clear | 23 | 7 | 13 | −6 |
| | Laminate Front Above | 22 | 7 | 12 | −6 |
| E5 | Clear | 31 | 7 | 16 | −10 |
| | Opaque | 25 | −11 | 16 | −12 |
| | Laminate From Above | 25 | −2 | 15 | −9 |
| E6 | Clear | 31 | 7 | 16 | −10 |
| | Clear | 23 | 7 | 13 | −6 |
| | Laminate From Above | 25 | 8 | 12 | −6 |
| E7 | Clear | 20 | 6 | 11 | −6 |
| | Opaque | 25 | −11 | 18 | −12 |
| | Laminate From Above | 20 | −1 | 12 | −8 |
| E8 | Clear | 31 | 7 | 19 | −8 |
| | Opaque | 33 | −19 | 25 | −20 |
| | Laminate From Above | 27 | −1 | 17 | −10 |
| E9 | Clear | 30 | 9 | 18 | −6 |
| | Opaque | 30 | −15 | 23 | −17 |
| | Laminate From Above | 25 | −2 | 16 | −9 |
| E10 | Clear | 30 | 9 | 18 | −6 |
| | Opaque | 25 | −7 | 21 | −15 |
| | Laminate From Above | 24 | 0 | 14 | −7 |
| E11 | Clear | 23 | 15 | 12 | −1 |
| | Opaque | 26 | −8 | 20 | −13 |
| | Laminate From Above | 21 | 5 | 12 | −5 |
| E12 | Clear | 30 | 9 | 18 | −6 |
| | Clear | 26 | 14 | 15 | −3 |
| | Laminate From Above | 23 | 10 | 12 | −5 |
| E13 | Clear | 23 | 15 | 12 | −1 |
| | Clear | 24 | 17 | 13 | 0 |
| | Laminate From Above | 20 | 13 | 9 | −3 |

As used herein in connection with measured quantity, "roll speeds" are the machine speeds that are measured using a tachometer, wherein "S1" is input roll speed measured in ft/min; and "S2" is output roll speed measured in ft/min. "Film speeds" are the actual surface film speeds as measured by a tachometer, wherein "F1" is the input film speed measured in ft/min; and "F2" is the output film speed measured in ft/min. "T1" is input film thickness. "W1" is input film width. "T2" is output film thickness. "W2" is output film width. As used herein in connection with calculated ratios: "Run Speed Ratio" is RS=S2/S1; "Film Draw Ratio" is RD=T1×W1/(T2×W2). Also as used herein, MD mechanical draw is the ratio of output roll speed to input roll speed.

For purposes of the present invention, the input roll speed (S1) has a preferred range of 200 to 1500 ft/min with a more preferred range of 750 to 850 ft/min with most preferred range of 800 ft/min. The output roll speed (S2) has a preferred range of 201 to 1501 ft/min with a more preferred range of 1050 to 1100 ft/min and with a most preferred range of 1100 to 1300 ft/min. RD is calculated at a preferred range of 1.01 to 1.5 with a more preferred range of 1.1 to 1.37 and a most preferred range in clear film of 1.12 to 1.27 and 1.18 to 1.35 in opaque film. The preferred temperature range for imparting the desired shrink properties is 70° C. to 160° C. with a more preferred range of 90° C. to 130° C. and a most preferred range of 100° C. to 120° C.

The preferred method of and means for heating the film is selected from the group consisting of heated rolls, hot air oven, and infrared oven. The more preferred method of heating the film is heated rolls and infrared ovens, with the most preferred method being heated rolls. The preferred number of draw gaps is between one and 12 with the more preferred number being between one and six.

The film thickness at S1 has a preferred range of 40 to 200 gauge with a more preferred gauge in clear film within the range of 60 to 110 gauge and in opaque film within the range of 90 to 140 gauge. The most preferred gauge in clear film is within the range of 70 to 90 gauge and within the range of 120 to 140 gauge in opaque film.

The type of film anchorage during draw includes electrostatic pinning and nip rolls with both types being preferred. The film tension during draw has a preferred range of 2000 psi to 10,000 psi.

EXAMPLE II-4

Laminations of Shrink Label Films

Figure 4:
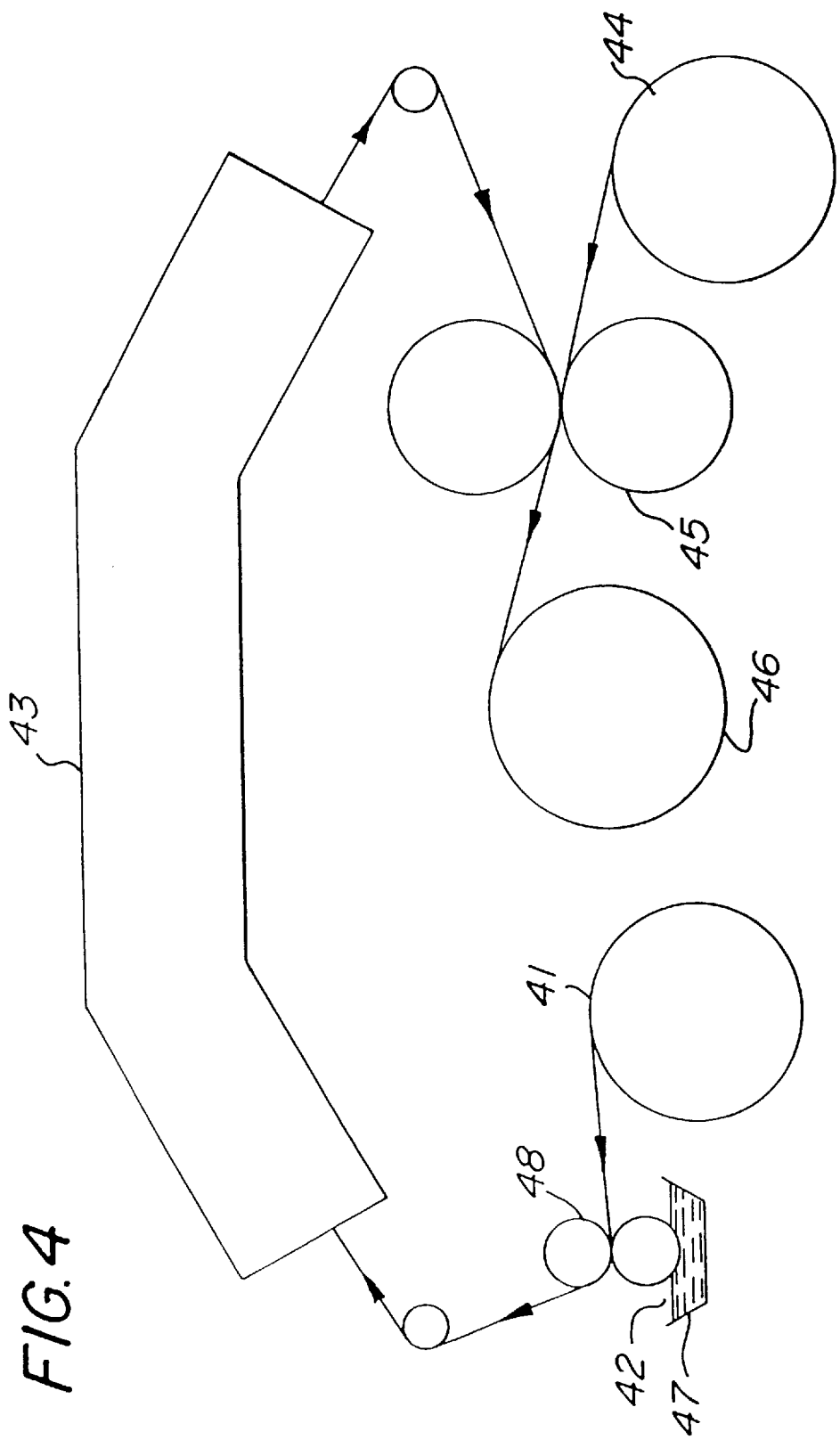
FIG. 4 is a schematic illustration showing a process for making shrink film laminates.

Reference is made to FIG. 4, which schematically illustrates a film lamination process wherein a shrinkable label film lamination is prepared by coating one side of one roll of shrinkable label film 41 with an adhesive solution 42, evaporating the solvent in an oven 43, then bringing the coated side into contact with another roll of shrinkable label film 44 in a combining nip 45. The resulting roll of shrinkable label film lamination 46 is then wound up.

A 20 inch wide roll 41 of shrinkable label film is mounted in the primary unwind stand of a Faustel printer-coater-laminator. This film can be either clear or opaque shrinkable label film but is usually clear.

A thermosetting urethane adhesive, Morton Adcoat 333, is diluted with methyl ethyl ketone until a #2 Zahn cup viscosity of 17.5 is achieved. This adhesive solution 42 is placed into a reservoir 47 in contact with a 130 quad pattern gravure cylinder 48, chosen to deliver an adhesive coating weight of 0.7 to 1.5 lb/ream to the shrinkable label film at 200 ft/min.

One side of the shrinkable label film is coated with the adhesive by direct gravure coating. If the film is caused to be opaque by containing voids, it is preferred that the side to be coated with adhesive consists of a thin, nonvoided skin.

Solvent is evaporated from the film coated with adhesive in a drying tunnel 43 maintained at 170° C. to 180° C. during a 3.5 second residence period. The tension in this film web is maintained at 0.75 lb/linear inch.

A second roll 44 of 20 inch wide shrinkable label film is mounted in a secondary unwind stand. It can be either a clear or opaque, coated or metallized shrinkable label film. The tension of this film web is maintained at from about 1 to 1.25 lb/linear inch.

The coated surface of the primary film is then brought in contact with one side of the second shrinkable label film roll under pressure in a combining nip 45. If the second film is caused to be opaque by containing voids, it is preferred that the side to be brought in contact with the adhesive coated side consist of a thin, nonvoided skin. The resulting laminated roll 46 is wound up on a winding stand.

The novel polyolefin shrink films in accordance with the present invention have been discovered to be particularly advantageous in labeling articles having irregular shapes. For purposes of the present invention, the article may be a straight-walled or contoured aluminum, steel, metal, plastic, glass, composite, or tubular or spiral wound cardboard container (especially a can or tin) for beverages (especially soda and beer), foods, or aerosols.

In this regard, either a single layer or laminate layers of novel polymer shrink films in accordance with the present invention is capable of being heat shrunk onto an article, such as a beverage can, the upper and bottom parts of which are tapered inwardly. The novel shrink films and laminates of novel shrink films in accordance with the present invention are particularly advantageous in labeling more modern beverage cans which taper inwardly at the upper and lower extremities so that a label must either avoid extending to these extremities or must conform closely to the shapes thereof: for example, in accordance with the procedures disclosed in U.S. Pat. No. 4,844,957, the disclosure of which is hereby incorporated herein in its entirety by reference thereto.

For purposes of this embodiment of the present invention, incoming packages are spaced by an infeed worm and transferred, via the infeed star, to a central rotary carousel. Here, firmly located between a base platform and overhead centering bell, they are caused to rotate about their own axes. As the label is withdrawn laterally from the magazine, it receives hot melt adhesives to provide the overlap bond. Continued rotation of the package past a short brushing section ensures a positive overlap seal. The fully label led packages are then transferred, via the discharge star-wheel, to the down-stream conveyor.

The labeller is particularly useful for applying wrap-around labels made from shrinkable plastic film in which case, the overlap bond is achieved by the previously mentioned hot melt adhesive technique. The adhesive used is dependent upon the type of plastic film used. The plastic label is applied in the previously described otherwise conventional way by the labeller using the hot melt adhesive, and the size of the label is such that it extends (top and bottom) beyond the cylindrical portion of the bottle or can. After labelling, bottles or cans are passed through a heating sector to ensure the upper and lower label areas shrink tightly and uniformly to the bottle contours. For purposes of the present invention, it has been discovered that hot air preferably should be directed toward the top and bottom of the label or other specific area of the labelled container where a non-uniform contour is located to allow preferential shrinkage of the heat shrink labels in these areas.

In contrast to the present invention, none of the conventional labels or other known labels have been observed to be as suitable for labeling of irregularly shaped beverage containers, and other irregularly shaped articles, as contemplated in accordance with the present invention. For example, conventional labels have been observed to distort during the process of applying the same to irregular shaped articles, for example by heat shrinking. More importantly, however, such conventional labels, and particularly laminated labels, do not readily conform to the irregular shape of the article, for example, especially at the tapered extremes of beverage containers, such as cans.

Thus, in accordance with the present invention, an irregular shape article, such as a beverage container, which includes a cylindrical wall of metal, glass, or plastic and a top and a bottom on the wall, wherein the wall tapers inwardly adjacent to the top/bottom to form top and bottom tapered portion is provided with a heat shrinkable layer, or laminated layers of novel shrink film produced in accordance with the present invention, to encircle the wall and conform to the tapered portions, for example, as disclosed in U.S. Pat Nos. 4,704,173 and 4,844,957, the disclosures of which are hereby incorporated in their entireties by reference thereto herein. Preferably, the label comprises first and second layers in laminated relationship.

The novel and unique polymer shrink films and laminates of the present invention are particularly suitable for labelling non-uniform contoured articles with a printed single layer of the oriented polymer shrink film or printed laminate of oriented polymer shrink film or printed laminate of oriented polymer shrink film which, by exposure to a prescribed heat history, shrinks to conform to the contour the article, such as a beverage container.

For purposes of the present invention, certain requirements for the processes for the polymer shrink film manufacture, lamination of the polymer shrink films, and the container labeling and packaging have been discovered to be important in order to realize the advantages of the present invention.

In this regard, it is critical that the shrink film must manifest a resistance to MD directional alteration in dimension during typical label preparation and application to maintain uniform repeat length and registration as imparted by applied heat/or tension history. The film also must be resistant to MD and/or TD directional lamination curl to maintain uniform lamination flatness. The film should maintain overall web flatness, as exhibited by typical oriented polyolefin films, as well as single web or lamination stiffness as required for conventional printing, laminating, and label-to-container feeding operation.

Another important advantage of the present invention is that the use of a polyolefin based label is inherently more environmentally compatible in the manufacture and recycle process. Current shrink labels are foamed polystyrene and PVC. Foamed polystyrene is inherently environmentally unfriendly due to the use of chlorofluorocarbons (CFCs) in the foaming process, and PVCs are disliked due to the caustic incineration side products, which are eliminated by the present invention.

Although the invention has been described with reference to particular means, materials and embodiments, from the foregoing, one skilled in the are can easily ascertain the essential characteristics of the present invention; and various changes and modification may be made to various usages and conditions without departing from the spirit and scope of the invention as described in the claims that follow.

We claim:

1. A shrink film comprising a biaxially oriented transparent polymer film, the polymer being selected from the group consisting of polypropylene homopolymers, polypropylene copolymers and blends thereof, said polymer film having a machine direction shrinkage and a transverse direction shrinkage that is less than or equal to 50% of the machine direction shrinkage and wherein the machine direction shrinkage is greater than 15% and the transverse direction shrinkage is less than 10% at about 140° C.

2. The shrink film of claim 1 wherein the polymer film is selected from the group consisting of multilayer films, coextruded films, extrusion coated films, clear films, opaque films, coated films and metallized films.

3. The shrink film of claim 1 wherein the polymer film comprises polypropylene homopolymer.

4. The shrink film of claim 1 wherein the polymer film has a thickness in the range of about 50 to 200 gauge.

5. The shrink film of claim 1 wherein the polymer film has a thickness in the range of about 70 to about 140 gauge.

6. The shrink film of claim 1 wherein the polymer film has a thickness in the range of about 60 to 140 gauge.

7. The shrink film of claim 1 wherein the shrink film is wound onto a roll.

8. The shrink film of claim 7, wherein the shrink film is wound onto a roll such that the transverse direction is arranged widthwise along the roll.

9. The shrink film of claim 1 wherein the polymer film has the following six tensile properties:

modulus (machine direction) of 350,000–850,000 psi;

modulus (transverse direction) of 100,000–500,000 psi;

tensile strength (machine direction) of 30,000–50,000 psi;

tensile strength (transverse direction) of 15,000–35,000 psi;

ultimate elongation (machine direction) of 20–120%; and ultimate elongation (transverse direction) of 50–250%.

10. The shrink film of claim 1 additionally comprising a slip agent.

11. A biaxially oriented shrink film produced by heating a biaxially oriented transparent polymer film to a temperature within the range of about 100° C. to 180° C., the polymer being selected from the group consisting of polypropylene homopolymers, polypropylene copolymers and blends thereof; drawing the heated biaxially oriented film under conditions effective to extend the heated biaxially oriented film by at least 1.05 times the original length of the biaxially oriented film in the machine direction; and cooling the drawn film while the drawn film is under tension, whereby a shrink film is produced having a machine direction (MD) shrinkage and a transverse direction (TD) shrinkage that is less than or equal to 50% of the MD shrinkage and wherein the MD shrinkage is greater than 15% and the TD shrinkage is less than 10% at a temperature of 140° C.

12. An article having a non-uniform contour which is at least partially covered with at least one shrink film comprising a biaxially oriented transparent polymer film, the polymer being selected from the group consisting of polypropylene homopolymers, polypropylene copolymers and blends thereof, said polymer film having a machine direction shrinkage and a transverse direction shrinkage that is less than or equal to 50% of the machine direction shrinkage and wherein the machine direction shrinkage is greater than about 15% and the transverse direction shrinkage is less than 10% at about 140° C.

13. A shrink film comprising a biaxially oriented transparent polymer film, the polymer being selected from the group consisting of polypropylene homopolymers, polypropylene copolymers and blends thereof, said polymer film having a machine direction shrinkage and a transverse direction shrinkage that is less than or equal to 50% of the machine direction shrinkage and wherein the machine direction shrinkage is greater than 15% and the transverse direction shrinkage is less than 10% at about 140° C., wherein the shrink film has a kinetic film-to-film coefficient friction within the range of about 0.05 to about 0.40.

14. An article having a non-uniform contour which is at least partially covered with at least one shrink film comprising a biaxially oriented transparent polymer film, the polymer being selected from the group consisting of polypropylene homopolymers, polypropylene copolymers and blends thereof, said polymer film having a machine direction shrinkage and a transverse direction shrinkage that is less than or equal to 50% of the machine direction shrinkage and wherein the machine direction shrinkage is greater than 15% and the transverse direction shrinkage is less than 10% at about 140° C., wherein the polymer shrink film has a kinetic film-to-film coefficient of friction within the range of about 0.05 to about 0.40.

\* \* \* \* \*